(12) United States Patent
Chun et al.

(10) Patent No.: US 7,312,285 B2
(45) Date of Patent: Dec. 25, 2007

(54) METHOD FOR PREPARING NORBORNENE BASED ADDITION POLYMER CONTAINING ESTER OR ACETYL FUNCTIONAL GROUP

(75) Inventors: Sung-Ho Chun, Daejeon (KR); Won-Kook Kim, Daejeon (KR); Sung-Cheol Yoon, Daejeon (KR); Tae-Sun Lim, Daejeon (KR); Heon Kim, Daejeon (KR); Kyoung-Hoon Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 10/494,882

(22) PCT Filed: Jul. 7, 2003

(86) PCT No.: PCT/KR03/01350

§ 371 (c)(1),
(2), (4) Date: May 7, 2004

(87) PCT Pub. No.: WO2004/007564

PCT Pub. Date: Jan. 22, 2004

(65) Prior Publication Data

US 2004/0254318 A1 Dec. 16, 2004

(30) Foreign Application Priority Data

Jul. 10, 2002 (KR) .................. 10-2002-0040044
Jun. 24, 2003 (KR) .................. 10-2003-0041039

(51) Int. Cl.
*C08F 4/44* (2006.01)
(52) U.S. Cl. ............... 526/171; 526/172; 526/280; 526/281
(58) Field of Classification Search ........ 526/171, 526/172, 280, 281
See application file for complete search history.

(56) References Cited

U.S. PATENT DOCUMENTS

| | | | |
|---|---|---|---|
| 3,330,815 A | 7/1967 | McKeon et al. | |
| 4,831,172 A | 5/1989 | Hahn et al. | 556/419 |
| 5,011,730 A | 4/1991 | Tenney et al. | 428/209 |
| 5,179,171 A | 1/1993 | Minami et al. | 525/288 |
| 5,468,819 A | 11/1995 | Goodall et al. | 526/171 |
| 5,705,503 A | 1/1998 | Goodall et al. | 526/281 |
| 6,350,832 B1 | 2/2002 | Bell et al. | 526/161 |
| 6,455,650 B1 * | 9/2002 | Lipian et al. | 526/171 |
| 2002/0052454 A1 | 5/2002 | Lipian et al. | |

FOREIGN PATENT DOCUMENTS

| | | |
|---|---|---|
| EP | 0 729 480 B1 | 1/1999 |
| JP | 2000-169517 | 6/2000 |
| JP | 2000508080 | 6/2000 |
| JP | 2001516804 | 10/2001 |
| JP | 2001519821 | 10/2001 |
| WO | WO 00/20472 | 4/2000 |

OTHER PUBLICATIONS

Gaylord, N.G., et al. "Poly-2,3- and 2,7-Bicyclo[2.2.1]hept-2-enes: preparation and Structures of Polynorbornenes", J. Macromol. Sci-Chem., A11(5), pp. 1053-1070 (1977).
Kaminsky, W., et al. "Polymerization of Cyclic Olefins with Homogeneous Catalysts", Stud. Surf. Catal. 1990, 56, pp. 425-438.
Mathew, J.P., et al. "(n3-Allyl)palladium(II) and Palladium(II) Nitrile Catalysts for the Addition Polymerization of Norbornene Derivatives with Functional Groups", Macromolecules 1996, vol. 29, pp. 2755-2763.
Hohenberg, P., et al. "Inhomogeneous Electron Gas", Physical Review, vol. 136, No. 3B, Nov. 9, 1964, pp. B864-B871.
Kohn, W., et al. "Self-Consistent Equations Including Exchange and Correlation Effects", Physical Review, col. 140, No. 4A, Nov. 15, 1965, pp. A1133-A1138.
Delley, B. "An all-electron numerical method for solving the local density functional for polyatomic molecules", J. Chem.Phys. 92(1), Jan. 1, 1990, pp. 508-517.
Bergner, A., et al. "Ab initio energy-adjusted psudopotentials for elements of groups 13-17", Molecular physics, 1993, vol. 80, No. 6, pp. 1431-1441.
Delley, B. "A Scattering Theoretic Approach to Scalar Relativistic Corrections on Bonding", International Journal of Quantum Chemistry, vol. 69, (1998) pp. 423-433.
Dolg. M. "Energy-adjusted ab initio pseudopotentials for the first row transition elements" J. Chem. Phys. 86 (2), Jan. 15, 1987, pp. 866-872.
Mathew, et al.; "(n3-Allyl)palladium(II) Nitrile Catalysts for the Addition Polymerization of Norbornene Derivatives with Functional Groups"; Macromolecules; vol. 29; pp. 2755-2763; 1996.
Sen, et al.; "Catalysis by Solvated Transition-Metal Cations. Novel Catalytic Transformations of Alkenes by Tetrakis (acetonitrile)palladium Ditetrafluoroborate. Evidence for the Formation of Incipient Carbonium Ions as Intermediates"; J. Am. Chem. Soc.; vol. 103; pp. 4627-4629; 1981.
Breunig, et al.; "Transition-metal-catalyzed vinyl addition polymerizations of norbornene derivatives with ester groups"; Makromol. Chem.; vol. 193; 2915-2927; 1992.

(Continued)

*Primary Examiner*—Robert D. Harlan
(74) *Attorney, Agent, or Firm*—Cantor Colburn LLP

(57) ABSTRACT

The present invention relates to a method for preparing a cyclic olefin polymer by addition polymerization, and more particularly to a method for preparing a norbornene-based addition polymer, which comprises a step of contacting a norbornene-based monomer having an ester or acetyl group with a catalyst system comprising: a Group X transition metal compound; a compound comprising a neutral Group XV electron donor ligand having a cone angle of at least 160°; and a salt capable of offering an anion that can be weakly coordinated to the transition metal, in solvent. The norbornene-based addition polymer having an ester or acetyl group according to the present invention is transparent, has superior adhesivity and a low dielectric constant, and it generates no byproducts when attached to metal. Therefore, it can be used as an optical film, a retardation film, a protection film for a polarizer, POFs (plastic optical fiber), PCBs (printed circuit board), or insulators of electronic devices.

10 Claims, 7 Drawing Sheets

OTHER PUBLICATIONS

Hennis, et al.; "Novel, Efficient, Palladium-Based System for the Polymerization of Norbornene Derivatives: Scope and Mechanism"; Organometallics; vol. 20; pp. 2802-2812; 2001.

Plastic News; p. 24; Feb. 27, 1995.

Japanese Office Action dated Jun. 7, 2007 for Application No. 2004521251.

* cited by examiner

METHOD FOR PREPARING NORBORNENE BASED ADDITION POLYMER CONTAINING ESTER OR ACETYL FUNCTIONAL GROUP

BACKGROUND OF THE INVENTION (a) Field of the Invention

The present invention relates to a method for preparing a cyclic olefin polymer, and more particularly to a method for preparing a cyclic olefin polymer by addition polymerization of a norbornene-based compound containing polar functional groups such as an ester or an acetyl.

(b) Description of the Related Art

Currently, PMMA (polymethylmethacrylate) or PC (polycarbonate) is widely used for a transparent polymer. Although PMMA has good transparency, it has poor dimensional stability due to its high hygroscopicity. Therefore, it is not suitable for material for precision optical devices or displays.

Until now, inorganic substances such as silicon oxide or silicon nitride have been predominantly used for insulation materials. However, with the increasing need of small-sized and highly efficient devices, new high functional materials are required. In this regard, polymers having a low dielectric constant and hygroscopicity, superior adhesion to metal, strength, thermal stability and transparency, and high glass transition temperature ($T_g > 250°$ C.) attract a lot of attentions. Such polymers may be used for insulation films of semiconductor devices or TFT-LCDs, polarizer protection films for polaziers, multichip modules, integrated circuits (ICs), printed circuit boards, and molding compounds for electronic devices or optical materials for flat panel displays. Currently, polyimide, BCB (bis-benzocyclobutene), etc. are used as low dielectric materials for electronic devices.

Polyimide has long been used for electronic devices due to its thermal stability, oxidative stability, high glass transition temperature, and superior mechanical properties. However, it involves problems of corrosion due to high hygroscopicity, an increase in dielectric constant, its anisotropic electric property, a need for pre-treatment to reduce reaction with copper wire, its adhesion to metals, etc.

Although BCB has lower hygroscopicity and a lower dielectric constant than polyimide, its adhesion to metal is not good and curing at high temperature is required to obtain desired physical properties. Physical properties of BCB are affected by curing time and temperature.

Cyclic olefin copolymers are known to have low dielectric constants and hygroscopicity due to their low hydrocarbon content. Cyclic monomers can be polymerized by ROMP (ring opening metathesis polymerization), HROMP (ring opening metathesis polymerization followed by hydrogenation), or copolymerization with ethylene and homogeneous polymerization, as shown in the following Scheme 1.

Scheme 1

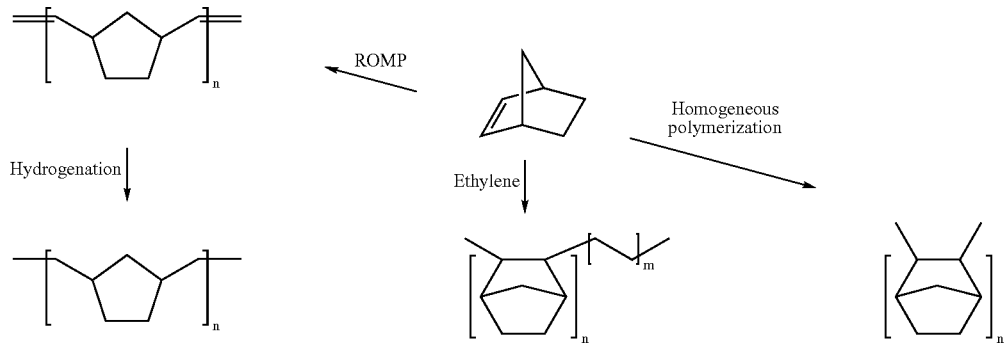

Polymers synthesized by ROMP have poor thermal stability and oxidative stability due to unsaturation of the main chain, and are used as thermoplastic resins or thermosetting resins. Tenny et al. discloses in U.S. Pat. No. 5,011,730 that a thermosetting resin prepared by the above method can be used as a circuit board by reaction injection molding. However, as mentioned above, it has problems of thermal stability, oxidative stability, and low glass transition temperature.

There has been an attempt to stabilize the main chain of the polymer by hydrogenation. Although a polymer prepared by this method has improved oxidative stability, the thermal stability is reduced. In general, hydrogenation increases the glass transition temperature of a ROMP polymer by about 50° C., but because of the ethylene groups located between the cyclic monomers, the glass transition temperature is still low (Metcon 99). Moreover, a cost increase due to increased polymerization steps and weak mechanical properties of the polymer are hindering its commercial use.

From addition co-polymerization with ethylene, a product called Apel was obtained using a homogeneous vanadium catalyst. However, this method has problems of low catalytic activity and generation of excessive oligomers.

A zirconium based metallocene catalyst has been reported to give a polymer having a narrow molecular weight distribution and a large molecular weight (*Plastic News*, Feb. 27, 1995, p. 24). However, the activity of the catalyst decreases with the increase of cyclic monomer concentration, and the obtained copolymer has a low glass transition temperature ($T_g < 200°$ C.). In addition, although the thermal stability increases, mechanical strength is weak and chemical resistance against solvents such as halogenated hydrocarbon solvents is poor.

Gaylord et al. have reported addition polymerization of norbornene in 1977 (Gaylord, N. G.; Deshpande, A. B.;

Mandal, B. M.; Martan, M. *J. Macromol. Sci.-Chem.* 1977, A11(5), 1053-1070). [Pd(C$_6$H$_5$CN)Cl$_2$]$_2$ was used as a catalyst and the yield was 33%. Later, a norbornene polymer was prepared using a [Pd(CH$_3$CN)$_4$][BF$_4$]$_2$ catalyst (Sen, A.; Lai, T.-W. *J. Am. Chem. Soc.* 1981, 103, 4627-4629).

Kaminsky et al. have reported homogeneous polymerization of norbornene using a zirconium-based metallocene catalyst (Kaminsky, W.; Bark, A.; Drake, I. *Stud. Surf. Catal.* 1990, 56,425). However, since a polymer obtained by this method is very crystalline and is hardly soluble in organic solvent, and thermal decomposition occurs without showing glass transition temperature, further studies could not be conducted.

Like the above-explained polyimide or BCB, the cyclic polymers also have poor adhesion to metal. For a polymer to be used for electronic devices, it should have good adhesion to a variety of surfaces, such as silicon, silicon oxide, silicon nitride, alumina, copper, aluminum, gold, silver, platinum, titanium, nickel, tantalum, chromium, and other polymers.

The following method has been introduced to increase adhesion of polyimide, BCB, etc. to metal. A substrate is treated with an organic silicon coupling agent having two functional groups such as amino-propyltriethoxysilane or triethoxyvinylsilane. Then, the substrate is reacted with a polymer or polymer precursor. In this reaction, it is believed that the hydrolyzed silyl group reacts with the hydroxy group on the substrate surface to form a covalent bond.

A cyclic polymer can be used for insulating electronic devices, replacing inorganic materials such as silicon oxide or silicon nitride. For a functional polymer to be used for electronic devices, it should have a low dielectric constant and hygroscopicity, superior adhesion to metal, strength, thermal stability and transparency, and a high glass transition temperature ($T_g$>250° C.).

Such a polymer can be used for insulation films of semiconductor devices or TFT-LCDs. Here, amino groups on the substrate surface react with functional groups of the polymer or polymer precursor to form bridges linking the substrate and the polymer. This technique has been disclosed in U.S. Pat. No. 4,831,172. However, this method is a multi-step process and requires a coupling agent.

Introduction of functional groups to a polymer comprising hydrocarbons is a useful method for the control of chemical and physical properties of the polymer. However, introduction of functional groups is not easy because unshared electron pairs of the functional groups tend to react with active catalytic sites. A polymer obtained by polymerizing cyclic monomers having functional groups has a low molecular weight (U.S. Pat. No. 3,330,815).

In order to overcome this problem, a method of adding the monomers having functional groups at a later step of polymerization (U.S. Pat. No. 5,179,171) has been proposed. However, thermal stability of the polymer has not increased by this method. Also, physical and chemical properties and adhesion to metal did not improve significantly.

As an alternative, a method of reacting functional groups with a base polymer in the presence of a radical initiator has been introduced. However, this method involves problems in that the grafting site of the substituents cannot be controlled and only a small amount of radicals are grafted. The excessive radicals cut the polymers to decrease molecular weight of the polymer. Or, they are not grafted to the base polymer but polymerize with other radicals.

When a polycyclic compound having a silyl group is used for an insulation film, it adheres to metal and by-products such as water or ethanol are produced, which are not completely removed to increase dielectric constant or cause corrosion of another metal.

Polymerization or copolymerization of norbornene having an ester or acetyl group has attracted continuous attentions (Risse, et al., *Macromolecules*, 1996, Vol. 29, 2755-2763; Risse, et al., *Makromol. Chem.* 1992, Vol. 193, 2915-2927; Sen, et al., *Organometallics* 2001, Vol. 20, 2802-2812; Goodall, et al., U.S. Pat. No. 5,705,503; Lipian, et al., WO 00/20472). Risse et al. activated a [($\eta^3$-ally)PdCl]$_2$ palladium compound with a cocatalyst such as AgBF$_4$ or AgSbF$_6$, or used a catalyst such as [Pd(RCN)$_4$][BF$_4$]$_2$. Sen, et al. activated [(1,5-cyclooctadiene)(CH$_3$)Pd(Cl)] with a phosphine such as PPh$_3$ and a cocatalyst such as Na$^+$[3,5-(CF$_3$)$_2$C$_6$H$_3$]$_4$B$^-$. U.S. Pat. No. 5,705,503 used a catalyst system similar to that reported by Risse, et al. ([($\eta^3$-ally)PdCl]$_2$ was activated with AgBF$_4$ or AgSbF$_6$.).

In addition polymerization or addition copolymerization of norbornene having an ester or acetyl group, excessive catalyst, as much as 1/100 to 1/400 moles of norbornene, has been used. Lipian, et al. reported polymerization of a norbornene-based monomer using a small amount of catalyst (WO 00/20472). However, most of the preferred embodiments refer to polymerization of alkyl norbornene or copolymerization of alkyl norbornene and silyl norbornene. Although Example 117 refers to polymerization of ester norbornene, the initial addition amount of ester norbornene is only 5% of that of butyl norbornene, suggesting that this method is not efficient for polymerization of ester norbornene. Although the content of ester norbornene in the prepared polymer is not presented, it is expected to be very small. Also, polymerization of norbornene having an acetyl group in Example 134 shows only about a 5% polymerization yield, indicating that the catalyst system is inefficient.

In addition, the literature reported by the inventors of WO 00/20472 in 2001 (Sen, et al., *Organometallics* 2001, Vol. 20, 2802-2812) shows that the polymerization yield of ester norbornene was below 40%, and an excessive amount of catalyst of as much as about 1/400 moles of the amount of the monomer was used.

It is believed that the reason why such a large amount of catalyst should be used is that catalytic activity decreases due to interaction with a polar group of norbornene such as an ester or acetyl group (Sen, et al., *Organometallics* 2001, Vol. 20, 2802-2812). Specifically, when polymerizing norbornene having an ester or acetyl group, an exo isomer is more stable thermodynamically, but an endo isomer is stabilized kinetically to generate more endo isomers than exo isomers.

This can be explained by interaction of oxygen lone-pair electrons and π-orbital of a diene in a Diels-Alder reaction or by steric interaction of a methyl group and an ester group of diene, as shown in the following Scheme 2 and Scheme 3.

Scheme 2
Transition state of an endo isomer

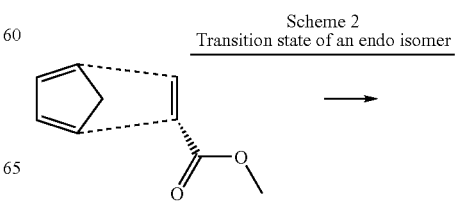

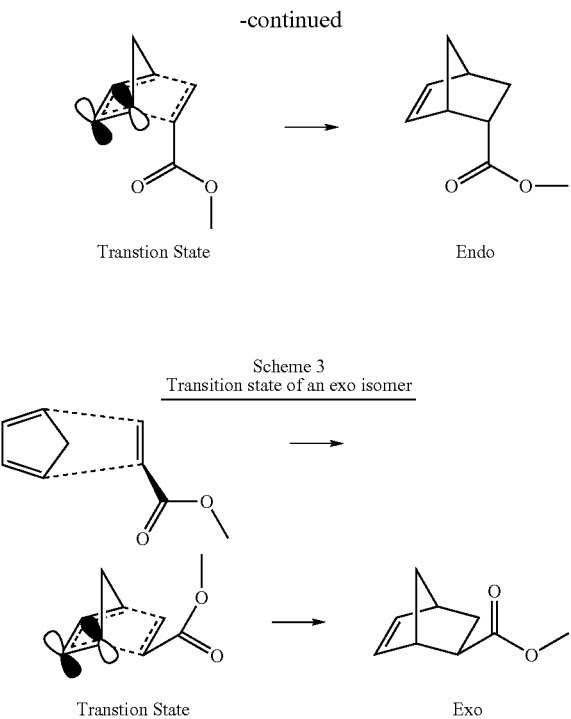

Transtion State           Endo

Scheme 3
Transition state of an exo isomer

Transtion State           Exo

The endo isomer is known to reduce catalytic activity in the subsequent polymerization steps (Risse, et al., *Macromolecules*, 1996, Vol. 29, 2755-2763; Risse, et al., *Makromol. Chem*. 1992, Vol. 193, 2915-2927). Therefore, in polymerization of a norbornene monomer having an ester or an acetyl group, it is desirable that more exo isomers exist in the polymerization solution, if possible. Also, a method of introducing a ligand designed to prevent a decrease in polymerization activity in the presence of endo isomers is required.

SUMMARY OF THE INVENTION

It is an object of the present invention to provide a catalyst system capable of preparing a cyclic olefin polymer having a low dielectric constant, low hygroscopicity, a high glass transition temperature, superior thermal stability and oxidative stability, good chemical resistance and toughness, and superior adhesion to metal, and a method for preparing a cyclic olefin polymer using the same.

It is another object of the present invention to provide a method for preparing a cyclic olefin polymer having superior optical characteristics that can be used for an optical film, a retardation film, a protection film of a polarizer, etc.

It is still another object of the present invention to provide a method for preparing a cyclic olefin polymer that can be used for electronic devices, such as integrated circuits, printed circuit boards, and multichip modules.

It is still another object of the present invention to provide a method for preparing a cyclic olefin polymer that can be attached to a substrate of an electronic device without using a coupling agent.

It is still another object of the present invention to provide a method for preparing a cyclic olefin polymer that has good adhesion to a substrate made of copper, silver, or gold.

It is still another object of the present invention to provide a method for preparing a homopolymer or copolymer of a norbornene-based compound having an ester or acetyl group.

It is still another object of the present invention to provide a method for preparing a copolymer of norbornene-based compound having an ester or acetyl group, which exhibits superior polymerization activity even under endo-rich conditions that endo isomers hold a great part of the norbornene-based monomers (50 mole % or more).

In order to achieve these objects, the present invention provides a catalyst system for preparing a norbornene-based addition polymer having a polar group such as an ester or acetyl group, which comprises:

a) a Group X transition metal compound;

b) a compound comprising a neutral Group XV electron donor ligand having a cone angle of at least 160°; and c) a salt capable of offering an anion that can be weakly coordinated to the a) transition metal compound.

The present invention also provides a method for preparing a norbornene-based addition polymer having a polar functional group such as an ester or acetyl group, which comprises a step of conducting an addition polymerization by contacting a norbornene-based monomer having an ester or acetyl group with a catalyst system comprising:

i) a Group X transition metal compound;

ii) a compound comprising a neutral Group XV electron donor ligand having a cone angle of at least 160°; and iii) a salt capable of offering an anion that can be weakly coordinated to the i) transition metal compound.

DETAILED DESCRIPTION OF THE PREFERRED EMBODIMENTS

Figure 1:
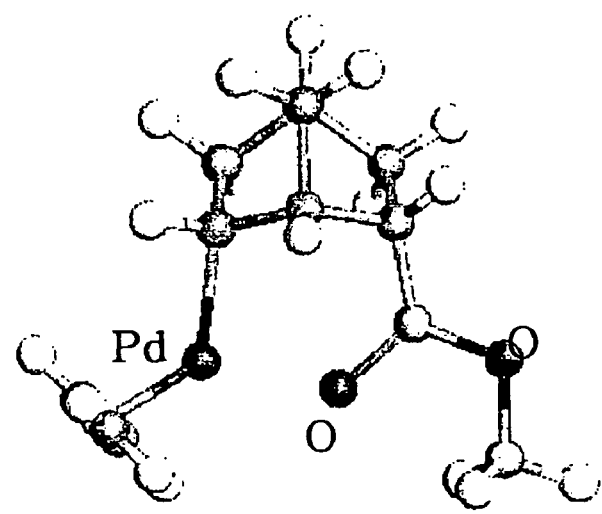
FIG. 1 is a schematic diagram showing interaction of an endo-norbornene ester and palladium metal.
Figure 2:
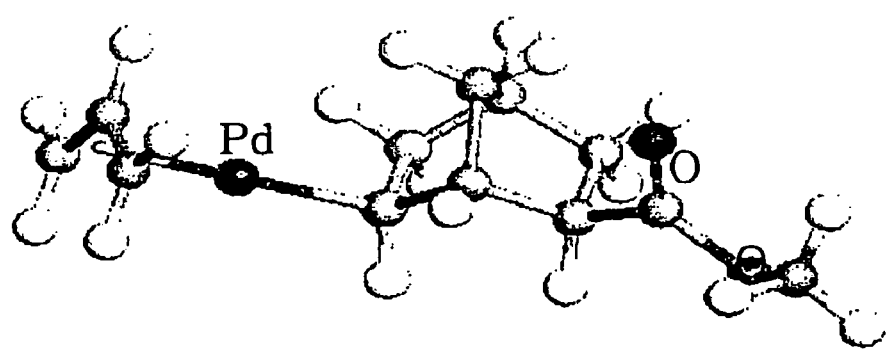
FIG. 2 is a schematic diagram showing interaction of an exo-norbornene ester and palladium metal.

Hereinafter, the present invention is described in more detail.

The present inventors have discovered that a norbornene-based addition polymer having a polar group of ester or acetyl group, which has high molecular weight and high yield regardless of the fact that the monomers are exo- or endo-isomer, can be prepared by an addition polymerization of norbornene-based monomers having polar group of ester or acetyl group in the presence of a catalyst into which a suitable ligand is introduced, and completed the present invention The present invention provides a highly active catalyst system for polymerization of norbornene-based polymer, which comprises a cocatalyst and a catalyst into which a suitable ligand capable of avoiding catalytic activity deterioration due to the ester group or acetyl group of an endo-isomer is introduced. And, the present invention also provides a method for preparing a norbornene-based addition polymer comprising norbornene-based monomers having an ester or acetyl group without loss of yield and molecular weight by addition polymerization of norbornene-based monomers having ester or acetyl group using the above catalyst system.

The catalyst system of the present invention can polymerize a norbornene-based compound having an ester or acetyl functional group using a much smaller amount of catalyst than that of prior art. Specifically, superior polymerization result can be obtained with a catalyst amount of only 1/2500 to 1/100,000 based on the weight of the norbornene monomer having an ester or acetyl group.

The catalyst system comprises: i) a Group X transition metal compound; ii) a compound comprising a neutral Group XV electron donor ligand having a cone angle of at least 160°; and iii) a salt capable of offering an anion that can be weakly coordinated to the i) transition metal, or a mixture thereof. Specifically, said components may be mixed in a solvent to prepare an activated catalyst solution to be used for polymerization, or they may be added respectively in a polymerization solution. The norbornene-based addition polymer may be a norbornene-based homopolymer having an ester or acetyl group, a copolymer of a norbornene-based monomer having a different ester or acetyl group, or a copolymer of a norbornene-based monomer having an ester or acetyl group and a norbornene-based monomer that does not comprise an ester or acetyl group.

The norbornene-based polymer having an ester or acetyl group of the present invention is prepared by homopolymerizing a norbornene-based monomer having at least one ester or acetyl group (represented by the following Chemical Formula 7) in the presence of a Group X metal catalyst, or by copolymerizing a norbornene-based monomer having an ester or acetyl group with norbornene in the presence of a catalyst system comprising the Group X metal catalyst.

[Chemical Formula 7]

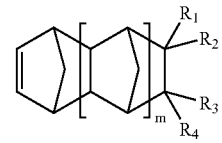

wherein m is an integer of 0 to 4;

at least one of $R_1$, $R_2$, $R_3$, and $R_4$ is a radical having an ester or acetyl group; and each of the other $R_1$, $R_2$, $R_3$, and $R_4$ is hydrogen; linear or branched $C_1$ to $C_{20}$ alkyl, alkenyl, or vinyl; $C_5$ to $C_{12}$ cycloalkyl substituted with hydrocarbon or unsubstituted; $C_6$ to $C_{40}$ aryl substituted with hydrocarbon or unsubstituted; $C_7$ to $C_{15}$ aralkyl substituted with hydrocarbon or unsubstituted; $C_3$ to $C_{20}$ alkynyl; or halogen.

If $R_1$, $R_2$, $R_3$ and $R_4$ are not radical having an ester or acetyl group, hydrogen or halogen, $R_1$ and $R_2$, or $R_3$ and $R_4$ may be connected to form a $C_1$ to $C_{10}$ alkylidene group, or, $R_1$ or $R_2$ may be connected with one of $R_3$ and $R_4$ to form a $C_4$ to $C_{12}$ saturated or unsaturated cyclic group or a $C_6$ to $C_{17}$ aromatic group.

A cyclic norbornene-based monomer or norbornene derivative refers to a monomer having at least one norbornene(bicyclo[2,2,1]hept-2-ene(bicyclo[2.2.1]hept-2-ene)) unit, which is represented by the following Chemical Formula 8.

[Chemical Formula 8]

The polymer of the present invention has cyclic repeating units having an ester or acetyl group, of which content is 0.1 to 100 mol %.

According to the present invention, a norbornene-based monomer comprising at least one ester or acetyl group and a norbornene-based monomer that does not comprise ester or acetyl group are polymerized in. a catalyst system comprising a Group X metal compound. As in the conventional polymerization process, the monomers and catalyst are mixed in a solvent, and the reaction mixture is polymerized. And, the norbornene-based monomers are used without separating endo- and exo-isomers.

Hereinafter, the catalyst system of the present invention is described in more detail.

Preferably, the i) Group X transition metal is represented by the following Chemical Formula 1:

$$M(R)_2 \qquad \text{[Chemical Formula 1]}$$

wherein

M is a Group X metal; and

R is an $(R')_2N$ or $(R')_2P$ ligand, or an anionic ligand offering σ- and π-bonds such as hydrocarbyl, acetylacetonate (R"C(O)CHC(O)R"), or acetate group.

Wherein each of R' and R" is hydrogen; $C_1$ to $C_{20}$ linear or branched alkyl, alkenyl, or vinyl; $C_5$ to $C_{12}$ cycloalkyl substituted with hydrocarbon or unsubstituted; $C_6$ to $C_{40}$ aryl substituted with hydrocarbon or unsubstituted; $C_6$ to $C_{40}$ aryl having hetero atom; $C_7$ to $C_{15}$ aralkyl substituted with hydrocarbon or unsubstituted; or $C_3$ to $C_{20}$ alkynyl.

Preferably, the ii) compound comprising a neutral Group XV electron donor ligand having a cone angle of at least 160° is represented by the following Chemical Formula 2 or Chemical Formula 3:

$$P(R^5)_{3-c}[X(R^5)_d]_c \qquad \text{[Chemical Formula 2]}$$

wherein

X is oxygen, sulfur, silicon or nitrogen;

c is an integer of 0 to 3;

d is 1 if X is oxygen or sulfur, 3 if X is silicon, and 2 if X is nitrogen;

if c is 3 and X is oxygen, two or three $R^5$ groups may be connected with each other through oxygen to form a cyclic group; and if c is 0, two $R^5$ groups may be connected with each other to form a phosphacycle; and $R^5$ is hydrogen; a $C_1$ to $C_{20}$ linear or branched alkyl, alkoxy, allyl, alkenyl, or vinyl; a $C_5$ to $C_{12}$ cycloalkyl substituted with hydrocarbon or unsubstituted; a $C_6$ to $C_{40}$ aryl substituted with hydrocarbon or unsubstituted; a $C_7$ to $C_{15}$ aralkyl substituted with hydrocarbon or unsubstituted; a $C_3$ to $C_{20}$ alkynyl; a tri($C_1$ to $C_{10}$ linear or branched alkyl)silyl; a tri($C_1$ to $C_{10}$ linear or branched alkoxy)silyl; a tri($C_5$ to $C_{12}$ cycloalkyl substituted with hydrocarbon or unsubstituted)silyl; a tri($C_6$ to $C_{40}$ aryl substituted with hydrocarbon or unsubstituted)silyl; a tri($C_6$ to $C_{40}$ aryloxy substituted with hydrocarbon or unsubstituted)silyl; a tri($C_1$ to $C_{10}$ linear or branched alkyl)siloxy; a tri($C_5$ to $C_{12}$ cycloalkyl substituted with hydrocarbon or unsubstituted)siloxy; or a tri($C_6$ to $C_{40}$ aryl substituted with hydrocarbon or unsubstituted)siloxy, wherein each substituent can be further substituted by a linear or branched haloalkyl or halogen; and $$(R^5)_2P-(R^6)-P(R^5)_2 \qquad \text{[Chemical Formula 3]}$$

wherein $R^5$ is the same as defined in the Chemical Formula 2; and $R^6$ is a $C_1$ to $C_5$ linear or branched alkyl, alkenyl or vinyl; a $C_5$ to $C_{12}$ cycloalkyl substituted with hydrocarbon or unsubstituted; a $C_6$ to $C_{20}$ aryl substituted with hydrocarbon or unsubstituted; or a $C_7$ to $C_{15}$ aralkyl substituted with hydrocarbon or unsubstituted.

Preferably, the iii) salt capable of offering an anion that can be weakly coordinated to the i) transition metal is represented by the following Chemical Formula 4:

$$[Cat]_a[Anion]_b \qquad \text{[Chemical Formula 4]}$$

wherein

"Cat" is a cation selected from a group consisting of a hydrogen ion; a cation of a Group I metal, Group II metal, or transition metal; and an organic group comprising the cations, to which the ii) neutral Group XV electron donor compound can be bonded;

"Anion", which can be weakly coordinated to the metal M of the compound represented by Chemical Formula 1, is selected from a group consisting of borate, aluminate, $SbF_6$, $PF_6$, $AlF_3O_3SCF_3$, $SbF_5SO_3F$, $AsF_6$, perfluoroacetate ($CF_3CO_2$), perfluoropropionate ($C_2F_5CO_2$), perfluorobutyrate ($CF_3CF_2CF_2CO_2$), perchlorate ($ClO_4$), p-toluenesulfonate (p-$CH_3C_6H_4SO_3$), boratabenzene, and caborane substituted by hydrocarbon or unsubstituted; and a and b respectively represent the numbers of cations and anions, determined so as to satisfy charge neutrality.

Preferably, the organic group comprising a cation in Chemical Formula 4 is selected from a group comprising ammonium such as $[NH(R^7)_3]^+$ and $[N(R^7)_4]^+$; phosphonium such as $[PH(R^7)_3]^+$ and $[P(R^7)_4]^+$; carbonium such as $[C(R^7)_3]^+$; and silylium such as $[Si(R^7)_3]^+$ (wherein $R^7$ is a $C_1$ to $C_{20}$ linear or branched alkyl, or alkyl or silyl alkyl substituted with halogen; a $C_5$ to $C_{12}$ cycloalkyl substituted with hydrocarbon or unsubstituted; a cycloalkyl or silyl cycloalkyl substituted with halogen; a $C_6$ to $C_{40}$ aryl substituted with hydrocarbon or unsubstituted; an aryl or silyl aryl substituted with halogen; a $C_7$ to $C_{15}$ aralkyl substituted with hydrocarbon or unsubstituted; or an aralkyl or silyl aralkyl substituted with halogen.).

Preferably, the borate or aluminate in Chemical Formula 4 is represented by the following Chemical Formula 5 or Chemical Formula 6:

$$[M'(R^8)(R^9)(R^{10})(R^{11})] \qquad \text{[Chemical Formula 5]}$$

$$[M'(OR^{12})(OR^{13})(OR^{14})(OR^{15})] \qquad \text{[Chemical Formula 6]}$$

wherein

M' is boron or aluminum; and each of $R^8$, $R^9$, $R^{10}$, $R^{11}$, $R^{12}$, $R^{13}$, $R^{14}$, and $R^{15}$ is $C_1$ to $C_{20}$ linear or branched alkyl or alkenyl substituted with halogen or unsubstituted; $C_5$ to $C_{12}$ cycloalkyl substituted with hydrocarbon or unsubstituted; $C_6$ to $C_{40}$ aryl substituted with hydrocarbon or unsubstituted; $C_7$ to $C_{15}$ aralkyl substituted with hydrocarbon or unsubstituted; $C_3$ to $C_{20}$ alkynyl; $C_3$ to $C_{20}$ linear or branched trialkylsiloxy; or $C_{18}$ to $C_{48}$ linear or branched trialkylsiloxy.

In the present invention, the norbornene-based compound is addition-polymerized in the presence of a highly active catalyst system that can prevent a decrease in catalytic activity due to an ester or acetyl group of endo isomer by introducing an appropriate ligand.

A DFT (density functional theory) calculation shows that the catalyst is much more stable when the polar group such as an ester is in the endo position of norbornene as shown in FIG. 1 than when it is in the exo position, due to a chelating effect of oxygen atoms of the ester on palladium (−17.4 Kcal/mol).

Accordingly, it is difficult for another ester norbornene monomer to approach the stabilized catalyst, and therefore a decrease in polymerization activity is inevitable. However, if a phosphine having an adequate size is introduced, a decrease in catalytic activity due to an endo-ester norbornene monomer can be avoided, which can be seen from calculation of DFT.

Figure 3A:
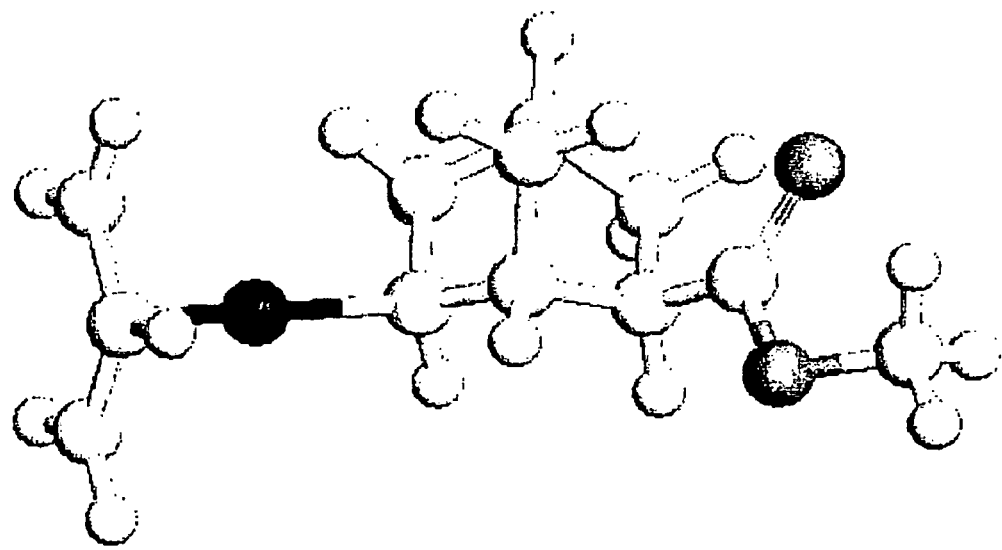
FIG. 3a is a schematic diagram of a structure wherein both the catalyst and the ester group are in exo positions to norbornene, showing structural stability according to the position of the catalyst and the ester group in case phosphine group does not exist.
Figure 3B:
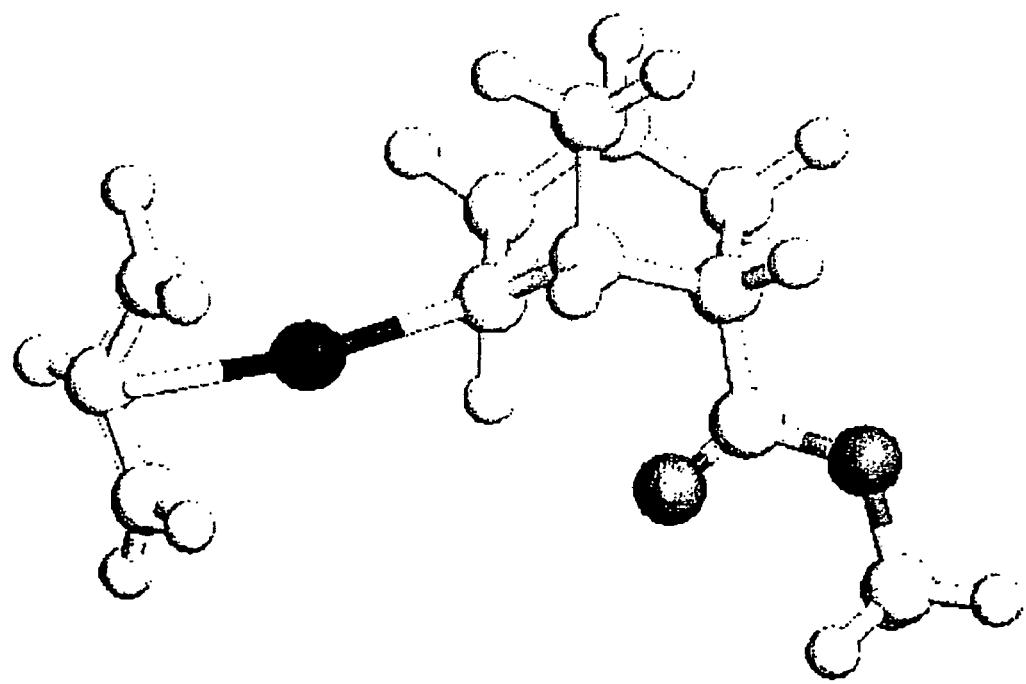
FIG. 3b is a schematic diagram of a structure wherein the catalyst is in an exo position but the ester group is in an endo position to norbornene, showing structural stability according to the position of the catalyst and the ester group in case phosphine group does not exist.
Figure 3C:
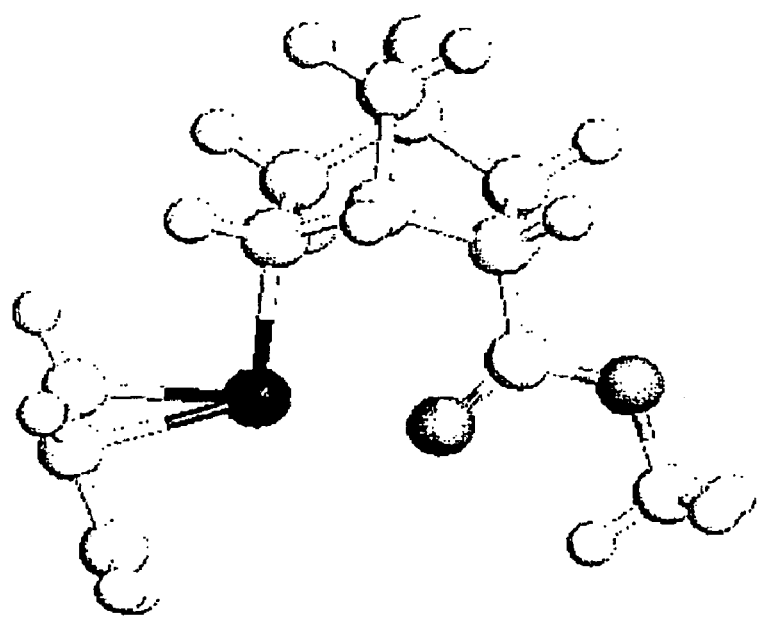
FIG. 3c is a schematic diagram of a structure wherein both the catalyst and the ester group are in endo positions to norbornene, showing structural stability according to the position of the catalyst and the ester group in case phosphine group does not exist.

FIG. 3a, FIG. 3b, and FIG. 3c compare structural stability according to position of the catalyst and the ester group in case phosphine group does not exist. FIG. 3a shows the structure wherein both the catalyst and the ester group are in the exo position to norbornene, FIG. 3b shows the structure wherein the catalyst is in the exo position but the ester group is in the endo position to norbornene, and FIG. 3c shows the structure wherein both the catalyst and the ester group are in the endo position to norbornene. Among the three structures, the structure of FIG. 3a is unstable by about 17.4 kcal/mol compared to the structure of FIG. 3c, and the structure of FIG. 3b is unstable by about 18.3 kcal/mol compared to the structure of FIG. 3c. Therefore, the structure having both the catalyst and the ester group in the endo position to norbornene is the most stable, and it is expected that the endo isomer will reduce polymerization activity.

Figure 4A:
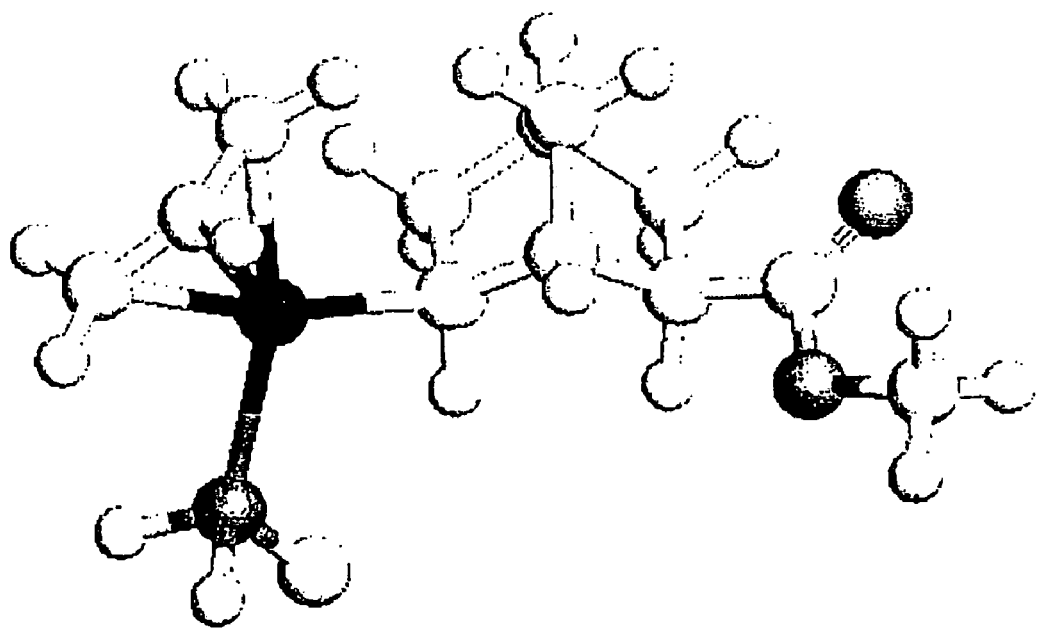
FIG. 4a is a schematic diagram of a structure wherein both the catalyst and the ester group are in exo positions to norbornene, showing structural stability according to the position of the catalyst and the ester group in case a $PH_3$ ligand exists.
Figure 4B:
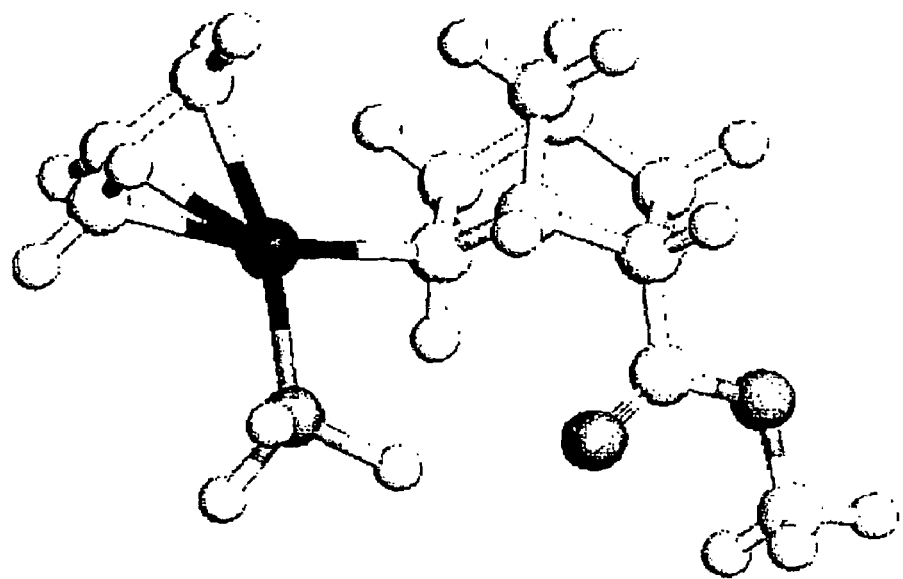
FIG. 4b is a schematic diagram of a structure wherein the catalyst is in an exo position but the ester group is in an endo position to norbornene, showing structural stability according to the position of the catalyst and the ester group in case a $PH_3$ ligand exists.
Figure 4C:
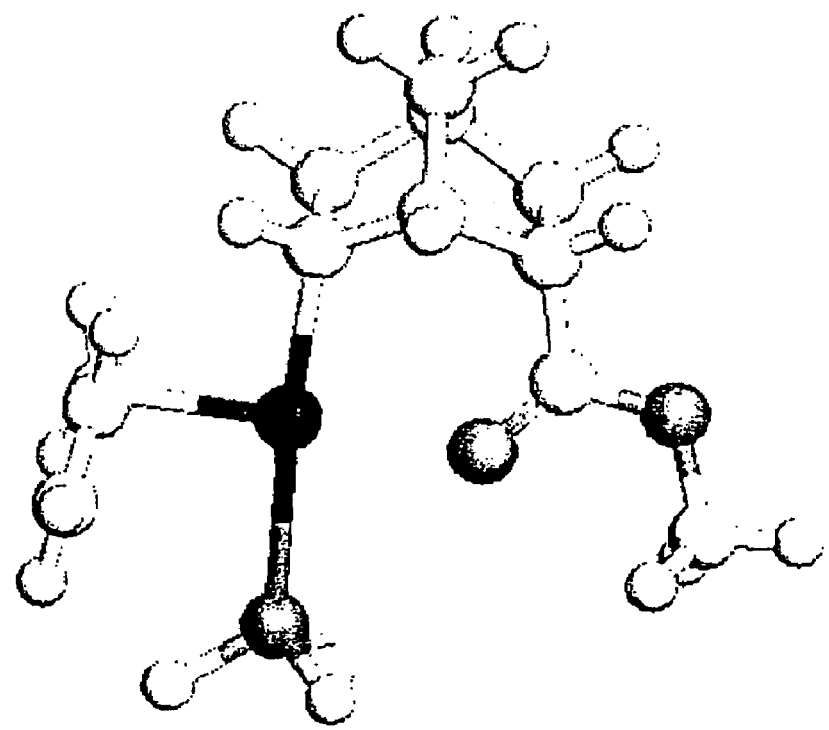
FIG. 4c is a schematic diagram of a structure wherein both the catalyst and the ester group are in endo positions to norbornene, showing structural stability according to the position of the catalyst and the ester group in case a $PH_3$ ligand exists.

When a phosphine ligand is introduced into the catalyst, its stability changes significantly according to its size. FIG. 4a, FIG. 4b, and FIG. 4c compare structural stability according to position of the catalyst and the ester group in case a $PH_3$ ligand exists in the catalyst. FIG. 4a shows the structure wherein both the catalyst and the ester group are in the exo position to norbornene, FIG. 4b shows the structure wherein the catalyst is in the exo position but the ester group is in the endo position to norbornene, and FIG. 4c shows the structure wherein both the catalyst and the ester group are in the endo position to norbornene. Among the three structures, the structure of FIG. 4a is unstable by about 6.6 kcal/mol compared to the structure of FIG. 4c, and the structure of FIG. 4b is unstable by about 4.83 kcal/mol compared to the structure of FIG. 4c. Therefore, the structure having both the catalyst and the ester group in the endo position to norbornene is the most stable, and a decrease in polymerization activity due to the endo isomer is inevitable. Although the relative difference in stability is smaller for a phosphine ligand having a small cone angle, such as $PH_3$, the endo structure is still the most stable.

The relative difference in stability decreases as the cone angle of the phosphine ligand increases. For $PPh_3$, the relative stability decreases significantly.

Figure 5A:
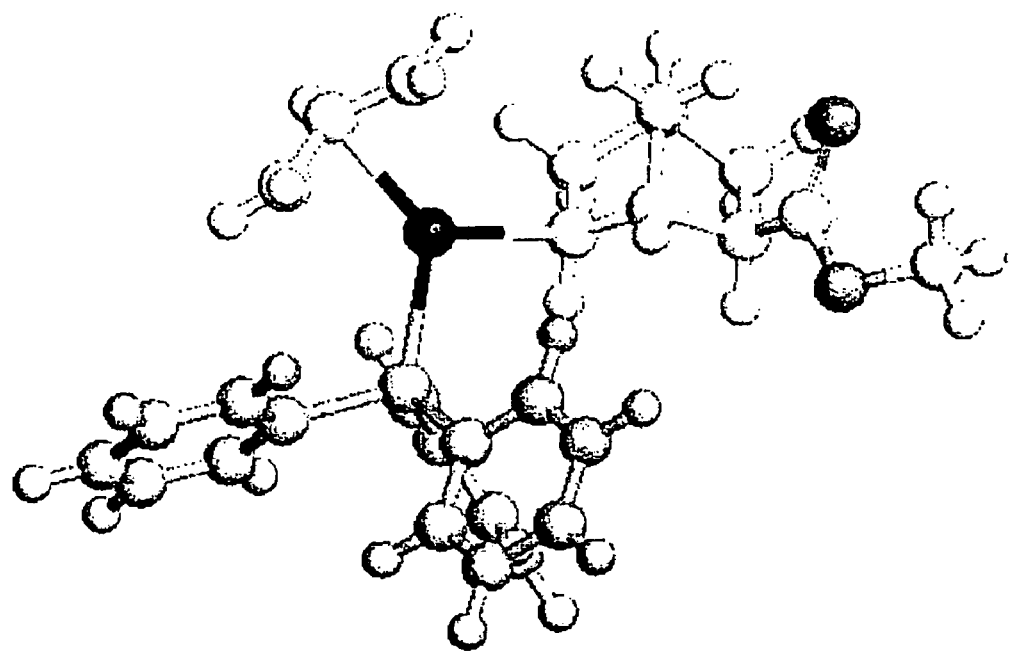
FIG. 5a is a schematic diagram of a structure wherein both the catalyst and the ester group are in exo positions to norbornene, showing structural stability according to the position of the catalyst and the ester group in case a PPh$_3$ ligand exists.
Figure 5B:
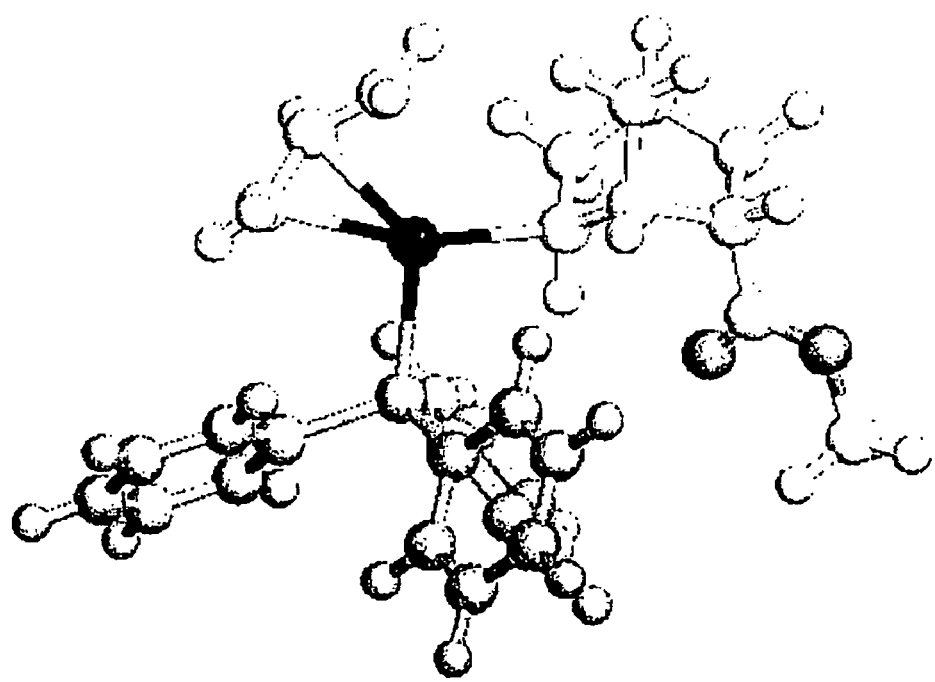
FIG. 5b is a schematic diagram of a structure wherein the catalyst is in an exo position but the ester group is in an endo position to norbornene, showing structural stability according to the position of the catalyst and the ester group in case a PPh$_3$ ligand exists.
Figure 5C:
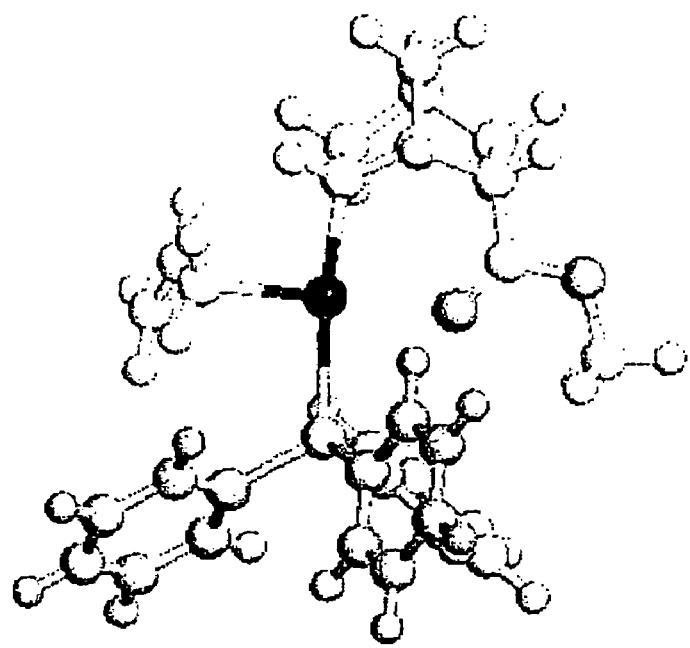
FIG. 5c is a schematic diagram of a structure wherein both the catalyst and the ester group are in endo positions to norbornene, showing structural stability according to the position of the catalyst and the ester group in case a PPh$_3$ ligand exists.

FIG. 5a, FIG. 5b, and FIG. 5c compare structural stability according to the position of the catalyst and the ester group in case a $PPh_3$ ligand exists in the catalyst. FIG. 5a shows the structure wherein both the catalyst and the ester group are in the exo position to norbornene, FIG. 5b shows the structure wherein the catalyst is in the exo position but the ester group is in the endo position to norbornene, and FIG. 5c shows the structure wherein both the catalyst and the ester group are in the endo position to norbornene. Among the three structures, the structure of FIG. 5a is unstable by about 5.44 kcal/mol compared to the structure of FIG. 5c, and the structure of FIG. 5b is unstable by about 4.62 kcal/mol compared to the structure of FIG. 5c. Therefore, the structure having both the catalyst and the ester group in the endo position to norbornene is the most stable, and a decrease of polymerization activity due to the endo isomer is inevitable.

Figure 6A:
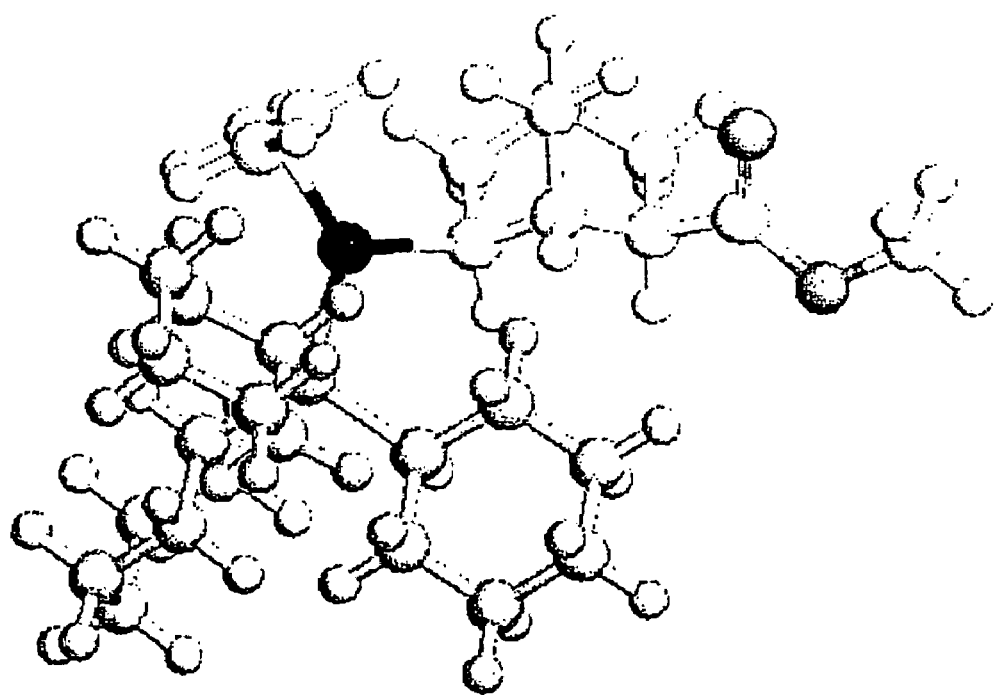
FIG. 6a is a schematic diagram of a structure wherein both the catalyst and the ester group are in exo positions to norbornene, showing structural stability according to the position of the catalyst and the ester group in case a P(cyclohexyl)$_3$ ligand exists.
Figure 6B:
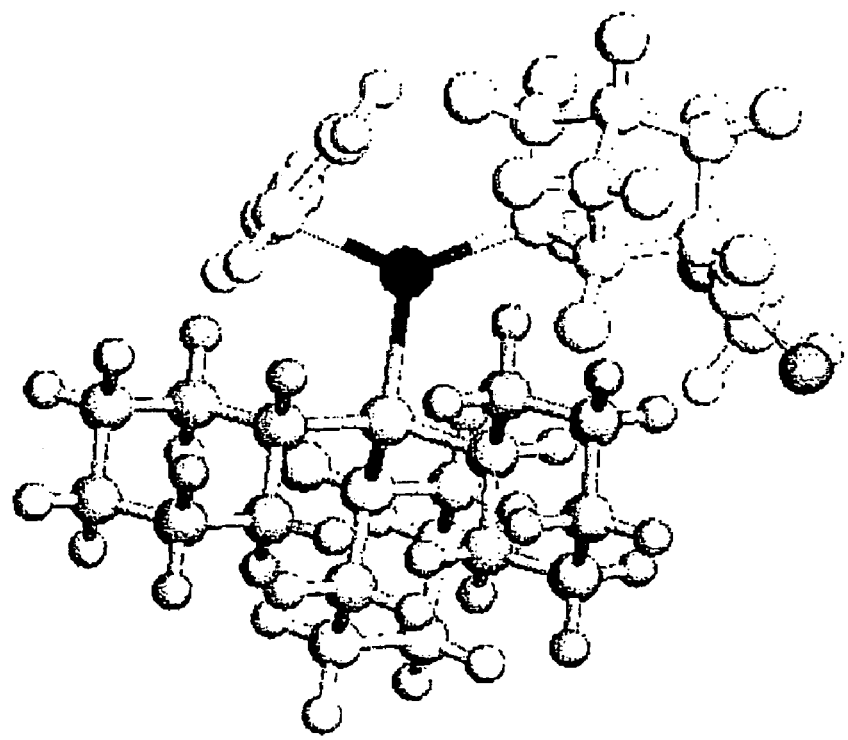
FIG. 6b is a schematic diagram of a structure wherein the catalyst is in an exo position but the ester group is in an endo position to norbornene, showing structural stability according to the position of the catalyst and the ester group in case a P(cyclohexyl)$_3$ ligand exists.
Figure 6C:
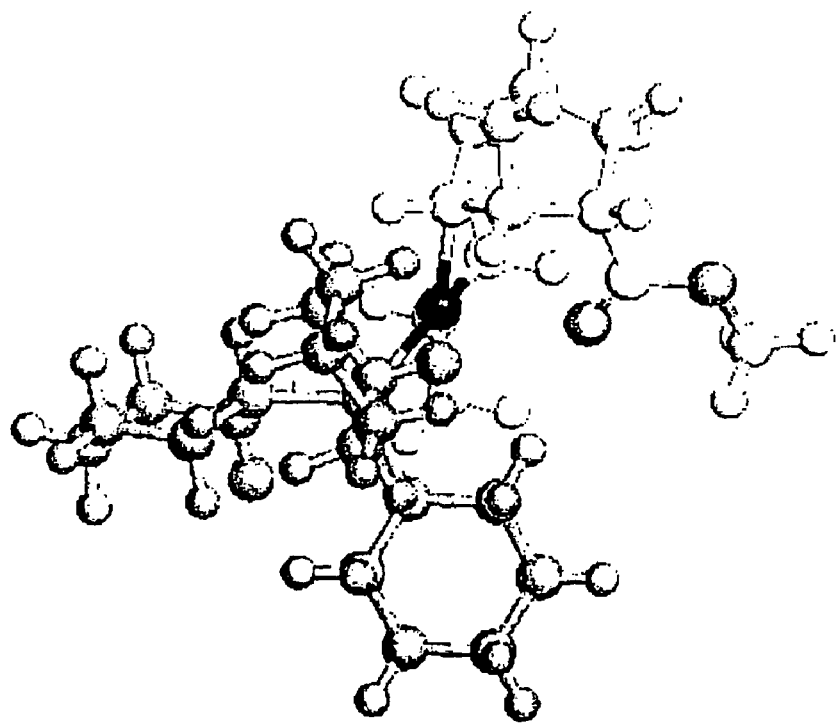
FIG. 6c is a schematic diagram of a structure wherein both the catalyst and the ester group are in endo positions to norbornene, showing structural stability according to the position of the catalyst and the ester group in case a P(cyclohexyl)$_3$ ligand exists.

However, the relative stability changes if the cone angle of the phosphine ligand is larger than 160°, as in P(cyclohexyl)$_3$. FIG. 6a, FIG. 6b, and FIG. 6c compare structural stability according to the position of the catalyst and the ester group in case a P(cyclohexyl)$_3$ ligand (cone angle=180°) exists in the catalyst. FIG. 6a shows the structure wherein both the catalyst and the ester group are in the exo position to norbornene, FIG. 6b shows the structure wherein the catalyst is in the exo position but the ester group is in the endo position to norbornene, and FIG. 6c shows the structure wherein both the catalyst and the ester group are in the endo position to norbornene. Among the three structures, the structure of FIG. 6a is stable by about 1.61 kcal/mol compared to the structure of FIG. 6c, and the structure of FIG. 6b is unstable by about 1.41 kcal/mol compared to the structure of FIG. 6c. Therefore, the structure having both the catalyst and the ester group in the endo position to norbornene is not stabilized, and a decrease of polymerization activity due to the endo isomer is prevented.

Accordingly, when a ligand having a large cone angle, such as a phosphine, is introduced in the catalyst, a decrease in catalytic activity due to the endo isomer can be avoided, and catalyst with improved activity can be designed. This catalytic activity improvement effect can also be seen in an anionic ligand offering σ- and π-bonding, such as acetylacetonate or acetate, as well as in an allyl ligand.

With regard to catalytic activity, a catalyst system comprising Pd(acac)$_2$ or Pd(acetate)$_2$, dimethylanilinium tetrakis (pentafluorophenylborate), and tricyclohexylphosphine is more effective than a catalyst system comprising [(allyl)Pd (Cl)]$_2$, borate, and phosphine, as will be shown in the Examples. The reason is believed that the acetylacetonate group is easily released from palladium to form a large space around the palladium, so a large norbornene monomer can access easily.

Accordingly, the present invention provides a catalyst system comprising a Group X transition metal, a neutral Group XV electron donor ligand having a cone angle of at least 160°, and a salt capable of offering an anion that can be weakly coordinated to the metal.

For this purpose, the catalyst system comprises:

i) 1 mol of a Group X transition metal;

ii) 1 to 3 mols of a compound comprising a neutral Group XV electron donor ligand having a cone angle of at least 160°; and iii) 1 to 2 mols of a salt capable of offering an anion that can be weakly coordinated to the i) transition metal.

Preferably, the catalyst system is used in an amount of 1/2500 to 1/100,000 based on the weight of the norbornene monomer having an ester or acetyl group, for polymerization of the norbornene having an ester or acetyl group.

Preferably, polymerization of the present invention is carried at a temperature range of −100° C. to 200° C., more preferably at −60° C. to 150° C., and most preferably at −10° C. to 150° C. The polymerization solvent is preferably selected from those having a boiling point higher than the polymerization temperature.

Preferably, the molecular weight (Mn) of the polymer of the present invention is in the range of 10,000 to 1,000,000.

The cyclic olefin addition polymer having an ester or acetyl group according to the present invention does not generate by-products because the ester or acetyl group is directly attached to metal.

The conventional polycyclic compounds having silyl groups are attached to metal to generate water or alcohol (e.g. ethanol) by-products, which are not completely removed during process to decrease dielectric constant or corrode metals. However, the cyclic olefin addition polymer having an ester or acetyl group of the present invention does not generate by-products when attached to metal, and rather it is strongly attached to metal, therefore there is no concern of decrease in dielectric constant or corrosion of metals.

Accordingly, the cyclic olefin addition polymer of the present invention has a low dielectric constant and hygroscopicity, a high glass transition temperature, superior thermal stability and oxidative stability, good chemical resistance and toughness, and superior adhesion to metal. Also, it has superior optical characteristics and can be attached to a substrate for electronic devices without a coupling agent. Since it is attached to a copper, silver, or gold substrate very well, it can be used for a low dielectric coating agent or film comprising electronic devices such as integrated circuits and multichip modules.

Hereinafter, the present invention is described in more in detail through Examples. However, the following Examples are only for the understanding of the present invention, and the present invention is not limited by the following Examples.

EXAMPLES

All procedures treating compounds sensitive to air or water were carried S out by the standard Schlenk technique or using a dry box. Nuclear magnetic resonance (NMR) spectrums were obtained using a Bruker 300 spectrometer. $^1$H NMR was measured at 300 MHz, and $^{13}$C NMR was measured at 75 MHz. Molecular weight and molecular weight distribution of polymers were measured by GPC (gel permeation chromatography) using a polystyrene sample as a standard. Thermal analysis, such as TGA and DSC, was carried out using a TA Instrument (TGA 2050; heating rate=10 K/min).

Toluene was purified by distillation in potassium/benzophenone, and $CH_2Cl_2$ was purified by distillation in $CaH_2$.

The BLYP(Becke-Lee-Yang-Parr) gradient corrected DFT(density functional theory) (Hohenberg, et al., *Phys. Rev. B.*, 1964, Vol. 136, 864; Kohn, et al., *J. Phys. Rev. A.*, 1965, Vol. 140, 1133) was employed to optimize all of the molecules, using the Dmol3 program(Delley, *J. Chem. Phys.* 1990, Vol. 92, 508; *J. Quant. Chem.* 1998, Vol. 69, 423).

ECP(The energy adjusted effective core potential) (Dolg, et al., *J. Chem. Phys.* 1987, Vol. 86, 866; Bergner, et al., *Mol. Phys.* 1993, Vol. 80, 1431) was used for Pd atom. DND (double numerical plus d-functional) was used for C, H, O, P atoms, and the valence electrons for Pd were expanded with the DND basis set.

No structural constraint was given in GO (geometry optimization) for calculating the minimum energy of isomers. Because every system has an OS (open shell) with a +1 charge and a doublet, SUOS-WF (spin-unrestricted open shell wave function) was used for calculation.

A medium grid was used for numerical integration, and the 0.005-hartree thermal smearing algorithm was applied for quick SCF convergence. In SCF, the density convergence criterion was set at $1 \times 10^{-5}$. In structure optimization, energy convergence and gradient convergence criterion were set at $2 \times 10^{-5}$ and $4 \times 10^{-5}$, respectively.

Preparation Example 1

Synthesis of Exo-rich Norbornene Carboxylic Acid Methyl Ester

DCPD (dicyclopentadiene, Aldrich, 256.5 mL, 1.9 mol), methylacrylate (Aldrich, 405 mL, 4.5 mol), and hydroquinone (3.2 g, 0.03 mol) were put in a 2 L autoclave. After heating to 180° C., reaction was carried out for 6 hours while stirring at 300 rpm. After the reaction was completed, the reaction mixture was cooled down and transferred to a distillation unit. The reaction mixture was distilled at 1 torr using a vacuum pump at 50° C. to obtain the product (yield: 86%). The mole ratio of exo-isomers to endo-isomers of the product was 52:48.

$^1$H-NMR (600 MHz, $CDCl_3$), endo: δ 6.17 (dd, 1H), 5.91 (dd, 1H), 3.60 (s, 3H), 3.17 (b, 1H), 2.91 (m, 1H), 2.88 (b, 1H), 1.90 (m, 1H), 1.42 (m, 2H), 1.28 (m, 1H); exo: δ 6.09 (m, 2H), 3.67 (s, 3H), 3.01 (b, 1H), 2.88 (b, 1H), 2.20 (m, 1H), 1.88 (m, 1H), 1.51 (d, 1H), 1.34 (m, 2H).

$^{13}$C-NMR (600 MHz, $CDCl_3$), endo: δ 29.10 ($CH_2$), 42.39 (CH), 43.03 (CH), 45.52 (CH), 49.47 ($CH_2$), 51.28 ($CH_3$), 132.23 (CH), 137.56 (CH), 175.02 (C); exo: δ 30.20 ($CH_2$), 41.49 (CH), 42.83 (CH), 46.21 ($CH_2$), 46.43 (CH), 51.53 ($CH_3$), 135.59 (CH), 139.90 (CH), 176.52 (C).

Preparation Example 2

Synthesis of Endo-Rich Norbornene Carboxylic Acid Methylester

DCPD (dicyclopentadiene, Aldrich, 256.5 mL, 1.9 mol), methylacrylate (Aldrich, 405 mL, 4.5 mol), and hydroquinone (3.2 g, 0.03 mol) were put in a 2 L autoclave. After heating to 180° C., reaction was carried out for 5 hours while stirring at 300 rpm. After the reaction was completed, the reaction mixture was cooled down and transferred to a distillation unit. The reaction mixture was distilled at 1 torr using a vacuum pump at 50° C. to obtain the product (yield: 86%). The mole ratio (mol %) of exo-isomers to endo-isomers of the product was 41.1:58.9.

$^1$H-NMR (600 MHz, $CDCl_3$), endo: δ 6.17 (dd, 1H), 5.91 (dd, 1H), 3.60 (s, 3H), 3.17 (b, 1H), 2.91 (m, 1H), 2.88 (b, 1H), 1.90 (m, 1H), 1.42 (m, 2H), 1.28 (m, 1H); exo: δ 6.09 (m, 2H), 3.67 (s, 3H), 3.01 (b, 1H), 2.88 (b, 1H), 2.20 (m, 1H), 1.88 (m, 1H), 1.51 (d, 1H), 1.34 (m, 2H).

$^{13}$C-NMR (600 MHz, $CDCl_3$), endo: δ 29.10 ($CH_2$), 42.39 (CH), 43.03 (CH), 45.52 (CH), 49.47 ($CH_2$), 51.28 ($CH_3$), 132.23 (CH), 137.56 (CH), 175.02 (C); exo: δ 30.20 ($CH_2$), 41.49 (CH), 42.83 (CH), 46.21 ($CH_2$), 46.43 (CH), 51.53 ($CH_3$), 135.59 (CH), 139.90 (CH), 176.52 (C).

Preparation Example 3

Synthesis of Exo-Rich Norbornene Carboxylic Acid Butyl Ester

DCPD (dicyclopentadiene, Aldrich, 180 mL, 1.34 mol), butylacrylate (Junsei, 500 mL, 3.49 mol), and hydroquinone (2.7 g, 0.025 mol) were put in a 2 L autoclave. After heating to 190° C., reaction was carried out for 5 hours while stirring at 300 rpm. After the reaction was completed, the reaction mixture was cooled down and transferred to a distillation unit. The reaction mixture was distilled at 1 torr using a vacuum pump at 80° C. to obtain the product (yield: 78%). The mole ratio (mol %) of the exo-isomers to endo-isomers of the product was 56.2:43.8.

$^1$H-NMR (600 MHz, $CDCl_3$), endo: δ 6.17 (dd, 1H), 5.86 (dd, 1H), 3.97 (t, 2H), 3.15 (b, 1H), 2.88 (m, 1H), 2.85 (b, 1H), 1.86 (m, 1H), 1.57 (m, 2H), 1.35 (m, 4H), 1.21 (m, 1H), 0.89 (t, 3H); exo: δ 6.09 (m, 2H), 4.05 (t, 2H), 2.98 (b, 1H), 2.86 (b, 1H), 2.20 (m, 1H), 1.88 (m, 1H), 1.58 (m, 2H), 1.50 (d, 1H), 1.34 (m, 4H), 0.89 (t, 3H).

$^{13}$C-NMR (600 MHz, $CDCl_3$), endo: δ 13.57 ($CH_3$), 19.04 ($CH_2$), 29.00 ($CH_2$), 30.63 ($CH_2$), 42.39 (CH), 43.20 (CH), 45.56 (CH), 49.45 ($CH_2$), 63.83 ($CH_2$), 132.21 (CH), 137.50 (CH), 174.05 (C); exo: δ 13.57($CH_3$), 19.04 ($CH_2$), 30.14 ($CH_2$), 30.63 ($CH_2$), 41.48 (CH), 43.04 (CH), 46.19 ($CH_2$), 46.48 (CH), 64.07 ($CH_2$), 135.61 (CH), 137.84 (CH), 176.05 (C).

Preparation Example 4

Synthesis of Endo-Rich Allylacetate Norbornene

DCPD (dicyclopentadiene, Aldrich, 248 mL, 1.852 mol), allylacetate (Aldrich, 500 mL, 4.63 mol), and hydroquinone (0.7 g, 0.006 mol) were put in a 2 L autoclave. After heating to 180° C., reaction was carried out for 5 hours while stirring at 300 rpm. After the reaction was completed, the reaction mixture was cooled down and transferred to a distillation unit. The reaction mixture was distilled twice at 1 torr using a vacuum pump at 56° C. to obtain the product (yield: 30%). The mole ratio (mol %) of the exo-isomers to endo-isomers of the product was 17:83.

1H-NMR (300 MHz, CDCl$_3$): δ 6.17~5.91 (m, 2H), 4.15~3.63 (m, 2H), 2.91~2.88 (m, 2H), 2.38 (m, 1H), 2.05 (s, 3H), 1.83 (m, 1H), 1.60~1.25 (m, 2H), 0.57 (m, 1H)

Example 1

Preparation of Norbornene Carboxylic Acid Methyl Ester Addition Homopolymer using Tricyclohexylphosphine and Pd(acac)$_2$ as Catalyst 10 g (65.7 mmol) of exo-rich norbornene carboxylic acid methyl ester synthesized in Preparation Example 1 and 15 mL of purified toluene were introduced into a 250 mL Schlenk flask, as monomer and solvent, respectively. Then, 2 mg of palladium (II) acetylacetonate dissolved in 5 ml of toluene and 1.84 mg of tricyclohexyl phosphine as a catalyst, and 10.6 mg of dimethylanilinium tetrakis(pentafluorophenyl)borate dissolved in 2 ml of CH$_2$Cl$_2$ as a cocatalyst were introduced into the flask, and reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 3.34 g of norbornene carboxylic acid methyl ester homopolymer (yield: 33.4 mol % of total monomer input). Number average molecular weight (Mn) of the polymer was 31,700, and weight average molecular weight (Mw) of the polymer was 71,400.

Example 2

Preparation of Norbornene Carboxylic Acid Butyl Ester Addition Homopolymer using Tricyclohexyl Phosphine and Pd(acac)$_2$ as a Catalyst 10 g (51.47 mmol) of exo-rich norbornene carboxylic acid butyl ester prepared in the Preparation Example 3 and 5 mL of purified toluene solvent were introduced into a 250 mL Schlenk flask. Then, 3.14 mg of palladium(II) acetylacetonate (Pd(acac)$_2$) and 2.89 mg of tricyclohexylphosphine dissolved in 5 mL of toluene, and 16.5 mg of dimethylanilinium tetrakis(pentafluorophenyl)borate dissolved in 2 mL of CH$_2$Cl$_2$ were added to the flask, as catalyst and cocatalyst, respectively. Then, reaction was carried out at 90° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 4.83 g of norbornene carboxylic acid butyl ester homopolymer (yield: 48.3 wt % of total monomer input). Number average molecular weight of the polymer was 45,000, and weight average molecular weight was 84,000.

Comparative Example 1

Preparation of Norbornene Carboxylic Acid Methylester Addition Homopolymer using Triphenyl Phosphine and Pd(acac)$_2$ as a Catalyst]

5 g (32,90 mmol) of the exo-rich norbornene carboxylic acid methylester prepared in the Preparation Example 1 as monomers and 5 ml of purified toluene were introduced in 250 ml Schlenk flask. To the flask, 1.00 mg of Pd(acac)$_2$ dissolved in 5 ml of toluene and 0.92 mg of triphenyl phosphine as a catalyst, and 5.26 mg of dimethylanilinium tetrakis(pentafluorophenyl)borate dissolved in 2 ml of CH2Cl2 as a cocatalyst were introduced. Then, reaction was carried out at 90° C. for 18 hours while stirring.

After the reaction was completed, the reactant was introduced into an excessive ethanol. However, copolymer precipitate could not be obtained.

Example 3

Preparation of Norbornene Carboxylic Acid Methyl Ester Addition Homopolymer using Tricyclohexyl Phosphine and Pd(acac)$_2$ as a Catalyst 10.46 g (68.7 mmol) of norbornene carboxylic acid methyl ester synthesized in Preparation Example 1 and 20 mL of purified toluene solvent were put in a 250 mL Schlenk flask, as monomer and solvent, respectively. Then, 1.54 mg of Pd(acac)$_2$ and 1.93 mg of tricyclohexyl phosphine dissolved in 5 mL of toluene, and 11.01 mg of dimethylanilinium tetrakis(pentafluorophenyl)borate dissolved in 2 mL of CH$_2$Cl$_2$ were added to the flask, as catalyst and cocatalyst, respectively. Then, reaction was carried out at 90° C. for 18 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 3.33 g of norbornene carboxylic acid methyl ester homopolymer (yield: 31.8 mol % of total monomer input). Number average molecular weight of the polymer was 27,500, and weight average molecular weight was 78,300.

Example 4

Preparation of Addition Copolymer of Norbornene Carboxylic Acid Methylester/Norbornene using Tricyclohexyl Phosphine and Pd(acac)$_2$ as a Catalyst Into a 250 ml Schlenk flask, 16.74 mg (110.0 mmol) of the exo-rich norbornene carboxylic acid methylester prepared in the Preparation Example 1 and 4.44 g (47.13 mmol) of norbornene as monomers, and 37 ml of purified toluene solvent were introduced. Into the flask, 4.79 mg of Pd(acac)$_2$ and 4.41 mg of tricyclohexyl phosphine dissolved in 5 ml of toluene as a catalyst, and 25.2 mg of dimethylanilinium tetrakis(pentafluorophenyl)borate dissolved in 2 ml of CH$_2$Cl$_2$ as a cocatalyst were added. Then, reaction was carried out at 90° C. for 18 hours while stirring.

After the reaction was completed, the reactant was introduced into an excessive ethanol to obtain white copolymer precipitate. The precipitate was filtered with a glass funnel and the recovered copolymer was dried in a vacuum oven at 65° C. for 24 hours to obtain 12.96 g of copolymer of norbornene and norbornene carboxylic acid methylester (yield: 61.2 mol % of total monomer input). Number average molecular weight of the polymer was 81,000, and weight average molecular weight was 164,000.

Example 5

Preparation of Addition Copolymer of Norbornene Carboxylic Acid Methylester/Butyl Norbornene using Tricyclohexyl Phosphine and Pd(acac)$_2$ as a Catalyst Into a 250 ml Schlenk flask, 10.46 mg (68.73 mmol) of the exo-rich norbornene carboxylic acid methylester prepared in the Preparation Example 1 and 10.24 g (6.73 mmol) of butyl norbornene as monomers, and 39 ml of purified toluene solvent were introduced. To the flask, 4.17 mg of Pd(acac)$_2$ and 3.86 mg of tricyclohexyl phosphine dissolved in 5 ml of toluene as a catalyst, and 22.1 mg of dimethylanilinium tetrakis(pentafluorophenyl)borate dissolved in 2 ml of CH$_2$Cl$_2$ as a cocatalyst were added. Then, reaction was carried out at 90° C. for 18 hours while stirring.

After the reaction was completed, the reactant was introduced into an excessive ethanol to obtain white copolymer precipitate. The precipitate was filtered with a glass funnel and the recovered copolymer was dried in a vacuum oven at 65° C. for 24 hours to obtain 15.15 g of copolymer of butyl norbornene and norbornene carboxylic acid methylester (yield: 73.2 mol % of total monomer input). Number average molecular weight of the polymer was 62,000, and weight average molecular weight was 140,000.

Example 6

Preparation of Addition Copolymer of Norbornene Carboxylic Acid Methylester/Hexyl Norbornene using Tricyclohexyl Phosphine and Pd(acac)$_2$ as a Catalyst Into a 250 ml Schlenk flask, 9.41 mg (61.85 mmol) of the exo-rich norbornene carboxylic acid methylester prepared in the Preparation Example 1 and 11.03 g (61.85 mmol) of hexyl norbornene as monomers, and 39 ml of purified toluene solvent were introduced. To the flask, 3.8 mg of Pd(acac)$_2$ and 3.5 mg of tricyclohexyl phosphine dissolved in 5 ml of toluene as a catalyst, and 20.8 mg of dimethylanilinium tetrakis(pentafluorophenyl)borate dissolved in 2 ml of CH$_2$Cl$_2$ as a cocatalyst were added. Then, reaction was carried out at 90° C. for 18 hours while stirring.

After the reaction was completed, the reactant was introduced into an excessive ethanol to obtain white copolymer precipitate. The precipitate was filtered with a glass funnel and the recovered copolymer was dried in a vacuum oven at 65° C. for 24 hours to obtain 18.02 g of copolymer of hexyl norbornene and norbornene carboxylic acid methylester (yield: 78.4 mol % of total monomer input). Number average molecular weight of the polymer was 50,000, and weight average molecular weight was 136,000.

Example 7

Preparation of Norbornene Carboxylic Acid Butyl Ester Addition Homopolymer using Tricyclohexyl Phosphine and Pd(acac)$_2$ as a Catalyst 40 g (205.9 mmol) of norbornene carboxylic acid butyl ester prepared in the Preparation Example 3 as monomers and 70 mL of purified toluene solvent were introduced into a 250 mL Schlenk flask. Then, 12.5 mg of Pd(acac)$_2$ and 11.6 mg of tricyclohexyl phosphine dissolved in 10 mL of toluene, and 66.0 mg of dimethylanilinium tetrakis(pentafluorophenyl)borate dissolved in 5 mL of CH$_2$Cl$_2$ were added to the flask, as catalyst and cocatalyst, respectively. Then, reaction was carried out at 80° C. for 90 hours while stirring.

After the reaction was completed, the reaction mixture was added to excess ethanol to obtain a white copolymer precipitate. The precipitate was filtered with a glass funnel and dried in a vacuum oven at 65° C. for 24 hours to obtain 29.9 g of norbornene carboxylic acid butyl ester homopolymer (yield: 74.8 mol % of total monomer input). Number average molecular weight of the polymer was 47,000, and weight average molecular weight was 92,000.

Example 8

Preparation of Norbornene Carboxylic Acid Butyl Ester Addition Homopolymer using Tricyclohexyl Phosphine and Pd(acac)$_2$ as a Catalyst 100 g (514.7 mmol) of norbornene carboxylic acid butyl ester prepared in the Preparation Example 3 and 180 mL of purified toluene were put in a 250 mL Schlenk flask, as monomer and solvent, respectively. Then, 32.36 mg of Pd(acac)$_2$ and 28.86 mg of tricyclohexylphosphine dissolved in 20 mL of toluene, and 164.9 mg of dimethylanilinium tetrakis(pentafluorophenyl)borate dissolved in 10 mL of CH$_2$Cl$_2$ were added to the flask, as catalyst and cocatalyst, respectively. Then, reaction was carried out at 80° C. for 90 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 73.7 g of norbornene carboxylic acid butyl ester homopolymer (yield: 73.7 mol % of total monomer input). Number average molecular weight of the polymer was 47,200, and weight average molecular weight was 91,800.

Example 9

Preparation of Addition Copolymer of Norbornene/norbornene Carboxylic Acid Butyl Ester using Tricylcohexylphosphine and Pd(acac)$_2$ as a Catalyst To a 250 ml Schlenk flask, 10 g (51.47 mmol) of the exo-rich norbornene carboxylic acid butyl ester prepared in the Preparation Example 3 and 4.85 g (51.47 mmol) of norbornene as monomers, and 25 ml of purified toluene solvent were introduced. To the flask, 6.27 mg of Pd(acac)$_2$ and 5.77 mg of tricyclohexyl phosphine dissolved in 5 ml of purified toluene as a catalyst, and 33.0 mg of dimethylanilinium tetrakis(pentafluorophenyl)borate dissolved in 2 ml of CH$_2$Cl$_2$ were added. Then, reaction was carried out at 80° C. for 17 hours.

After the reaction was completed, the reactant was introduced into an excessive ethanol to obtain white copolymer precipitate. The precipitate was filtered with a glass funnel and the recovered copolymer was dried in a vacuum oven at 65° C. for 24 hours to obtain 10.14 g of copolymer of norbornene and norbornene carboxylic acid butyl ester (yield: 68.3 mmol % of total monomer input). Number average molecular weight of the polymer was 126,000, and weight average molecular weight was 266,000.

Example 10

Preparation of Addition Copolymer of Norbornene Carboxylic Acid Butyl Ester/Butyl Norbornene using Tricyclohexylphosphine and Pd(acac)$_2$ as a Catalyst To a 250 ml Schlenk flask, 15.55 g (80.0 mmol) of the exo-rich norbornene carboxylic acid butyl ester prepared in the Preparation Example 3 and 11.93 g (80.0 mmol) of butyl norbornene as monomers, and 55 ml of purified toluene solvent were introduced. To the flask, 4.9 mg of Pd(acac)$_2$ and 4.5 mg of tricyclohexyl phosphine dissolved in 5 ml of purified toluene as a catalyst, and 25.6 mg of dimethylanilinium tetrakis(pentafluorophenyl)borate dissolved in 2 ml of CH$_2$Cl$_2$ were added. Then, reaction was carried out at 90° C. for 18 hours.

After the reaction was completed, the reactant was introduced into an excessive ethanol to obtain white copolymer precipitate. The precipitate was filtered with a glass funnel and the recovered copolymer was dried in a vacuum oven at 65° C. for 24 hours to obtain 18.1 g of copolymer of butyl norbornene and norbornene carboxylic acid butyl ester (yield: 65.9 mol % of total monomer input). Number average molecular weight of the polymer was 56,000, and weight average molecular weight was 132,000.

Example 11

Preparation of Norbornene Carboxylic Acid Butyl Ester Addition Homopolymer using Endo Isomers Only and using Tricylcohexylphosphine and Pd(acac)$_2$ as a Catalyst To a 250 ml Schlenk flask, 5.0 g (25.73 mmol) of norbornene carboxylic acid butyl ester endo isomers as monomers and 9 ml of purified toluene solvent were introduced. To the flask, 7.84 mg of Pd(acac)$_2$ and 7.22 mg of tricyclohexyl phosphine dissolved in 1 ml of toluene as a catalyst, and 41.2 mg of dimethylanilinium tetrakis(pentafluorophenyl)borate dissolved in 1 ml of $CH_2Cl_2$ were added. Then, reaction was carried out at 90° C. for 18 hours. After the reaction was completed, the reactant was introduced into an excessive ethanol to obtain white copolymer precipitate. The precipitate was filtered with a glass funnel and the recovered copolymer was dried in a vacuum oven at 65° C. for 24 hours to obtain 2.57 g of norbornene carboxylic acid butyl ester homopolymer (yield: 51.4 mol % of total monomer input). Number average molecular weight of the polymer was 31,000, and weight average molecular weight was 81,000.

Example 12

Preparation of Norbornene Carboxylic Acid Butyl Ester Homopolymer using Exo Isomers Only and using Tricyclohexyl Phosphine and Pd(acac)$_2$ as a Catalyst To a 250 ml Schlenk flask, 2.7 g (13.90 mmol) of norbornene carboxylic acid butyl ester exo isomers as monomers and 4.6 ml of purified toluene solvent were introduced. To the flask, 8.47 mg of Pd(acac)$_2$ and 7.8 mg of tricyclohexyl phosphine dissolved in 1 ml of toluene as a catalyst, and 44.5 mg of dimethylanilinium tetrakis(pentafluorophenyl)borate dissolved in 1 ml of $CH_2Cl_2$ were added. Then, reaction was carried out at 80° C. for 2 hours while stirring.

After the reaction was completed, the reactant was introduced into an excessive ethanol to obtain white copolymer precipitate. The precipitate was filtered with a glass funnel and the recovered copolymer was dried in a vacuum oven at 65° C. for 24 hours to obtain 1.53 g of norbornene carboxylic acid butyl ester homopolymer (yield: 56.7 mol % of total monomer input). Number average molecular weight of the polymer was 52,000, and weight average molecular weight was 97,000.

Example 13

Preparation of a Copolymer of Norbornene Carboxylic Acid Methylester/Norbornene Carboxylic Acid Butylester using Tricyclohexyl Phosphine and Pd(acac)$_2$ as a Catalyst Into a 500 ml Schlenk flask, 63.8 g (328.5 mmol) of the exo-rich norbornene carboxylic acid butyl ester prepared in the Preparation Example 3 and 50.0 g (328.5 mmol) of the exo-rich norbornene carboxylic acid methylester prepared in the Preparation Example 1 as monomers and 210 ml of purified toluene solvent were introduced. Into the flask, 40.0 mg of Pd(acac)$_2$ and 36.9 mg of tricyclohexyl phosphine dissolved in 20 ml of toluene as a catalyst and 210.6 mg of dimethylanilinium tetrakis(pentafluorophenyl)borate dissolved in 10 ml of $CH_2Cl_2$ as a co-catalyst were introduced. Then, reaction was carried out at 80° C. for 90 hours while stirring.

After the reaction was completed, the reactant was introduced into an excessive ethanol to obtain a copolymer precipitate. The precipitate was filtered with a glass funnel and the recovered copolymer was dried at 65° C. for 24 hours to obtain 89.94 g of copolymer of norbornene carboxylic acd butyl ester and norbornene carboxylic acid methyl ester (yield: 79.0 wt % of total monomer input). Number average molecular weight of the polymer was 50,000, and weight average molecular weight is 97,000.

Example 14

Preparation of 5-norbornene-2-yl Acetate Addition Homopolymer using Tricylcohexyl Phosphine and Pd(acac)$_2$ as a Catalyst Into a 250 ml Schlenk flask, 5 g (32.85 mmol) of the exo-rich 5-norbornene-2-yl acetate (containing 88 mol % of exo) as monomers and 9 ml of purified toluene solvent were introduced. Into the flask, 20.6 mg of Pd(acac)$_2$ and 18.93 mg of tricyclohexyl phosphine dissolved in 1 ml of toluene as a catalyst and 18.93 mg of dimethylanilinium tetrakis (pentafluorophenyl)borate dissolved in 2 ml of $CH_2Cl_2$ as a co-catalyst were introduced. Then, reaction was carried out at 80° C. for 17 hours while stirring.

After the reaction was completed, the reactant was introduced into an excessive ethanol to obtain a copolymer precipitate. The precipitate was filtered with a glass funnel and the recovered copolymer was dried at 65° C. for 24 hours to obtain 4.69 g of 5-norbornene-2-yl acetate homopolymer (yield: 93.8 wt % of total monomer input). Number average molecular weight of the polymer was 36,000, and weight average molecular weight is 88,000.

Example 15

Preparation of Allyl Acetate Norbornene Addition Homopolymer using Tricyclohexylphosphine and Pd(acac)$_2$ as a Catalyst Into a 250 ml Schlenk flask, 5 g (30.1 mmol) of the endo-rich allyl acetate norbornene prepared in the Preparation Example 4 as monomers and 10 ml of purified toluene solvent were introduced. Into the flask, 1.83 mg of Pd(acac)$_2$ and 1.69 mg of tricyclohexyl phosphine dissolved in 3 ml of $CH_2Cl_2$ as a catalyst and 9.64 mg of dimethylanilinium tetrakis(pentafluorophenyl)borate as a co-catalyst were introduced. Then, reaction was carried out at 90° C. for 18 hours while stirring.

After the reaction was completed, the reactant was introduced into an excessive ethanol to obtain a copolymer precipitate. The precipitate was filtered with a glass funnel and the recovered copolymer was dried at 65° C. for 24 hours to obtain 4.79 g of allyl acetate norbornene homopolymer (yield: 95.8 mol % of total monomer input). Number average molecular weight of the polymer was 78,000, and weight average molecular weight is 203,000.

Example 16

Preparation of Allyl Acetate Norbornene Addition Homopolymer using Tricyclohexyl Phosphine and Pd(acac)$_2$ as a Catalyst Into a 250 ml Schlenk flask, 10.0 g (60.2 mmol) of the endo-rich allyl acetate norbornene prepared in the Preparation Example 4 as monomers and 20 ml of purified toluene solvent were introduced. Into the flask, 1.35 mg of Pd(acac)$_2$ and 1.69 mg of tricyclohexyl phosphine dissolved in 3 ml of CH$_2$Cl$_2$ as a catalyst and 12.03 mg of dimethylanilinium tetrakis(pentafluorophenyl)borate as a co-catalyst were introduced. Then, reaction was carried out at 90° C. for 18 hours while stirring.

After the reaction was completed, the reactant was introduced into an excessive ethanol to obtain a copolymer precipitate. The precipitate was filtered with a glass funnel and the recovered copolymer was dried at 65° C. for 24 hours to obtain 4.72 g of allyl acetate norbornene homopolymer (yield: 47.2 mol % of total monomer input). Number average molecular weight of the polymer was 70,000, and weight average molecular weight is 140,000.

Example 17

Preparation of Addition Copolymer of Norbornene Carboxylic Acid Methylester/Norbornene Allyl Acetate using Tricyclohexyl Phosphine and Pd(acac)$_2$ as a Catalyst Into a 250 ml Schlenk flask, 9.16 g (60.2 mmol) of the exo-rich norbornene carboxylic acid methyl ester prepared in the Preparation Example 1 and 10.0 g (60.2 mmol) of the endo-rich norbornene allyl acetate prepared in the Preparation Example 4 as monomers and 38 ml of purified toluene solvent were introduced. Into the flask, 2.7 mg of Pd(acac)$_2$ and 3.37 mg of tricyclohexyl phosphine dissolved in 5 ml of CH2Cl2 as a catalyst and 19.2 mg of dimethylanilinium tetrakis(pentafluorophenyl)borate as a co-catalyst were introduced. Then, reaction was carried out at 90° C. for 18 hours while stirring.

After the reaction was completed, the reactant was introduced into an excessive ethanol to obtain a copolymer precipitate. The precipitate was filtered with a glass funnel and the recovered copolymer was dried at 65° C. for 24 hours to obtain 5.56 g of copolymer of norbornene carboxylic acd methyl ester and norbornene allyl acetate (yield: 29.0 mol % of total monomer input). Number average molecular weight of the polymer was 53,000, and weight average molecular weight is 122,000.

Example 18

Preparation of Addition Copolymer of Norbornene Carboxylic Acid Methylester/Norbornene Allyl Acetate using a Tricyclohexyl Phosphine and Pd(acac)$_2$ as a Catalyst Into a 250 ml Schlenk flask, 14.96 g (98.3 mmol) of the exo-rich norbornene carboxylic acid methylester prepared in the Preparation Example 1 and 7.0 g (42.1 mmol) of the endo-rich norbornene allyl acetate prepared in the Preparation Example 4 as monomers and 43 ml of purified toluene solvent were introduced. Into the flask, 3.15 mg of Pd(acac)$_2$ and 3.94 mg of tricyclohexyl phosphine dissolved in 5 ml of CH2Cl2 as a catalyst and 22.49 mg of dimethylanilinium tetrakis(pentafluorophenyl)borate as a co-catalyst were introduced. Then, reaction was carried out at 90° C. for 18 hours while stirring.

After the reaction was completed, the reactant was introduced into an excessive ethanol to obtain a copolymer precipitate. The precipitate was filtered with a glass funnel and the recovered copolymer was dried at 65° C. for 24 hours to obtain 8.81 g of copolymer of norbornene carboxylic acd methyl ester and norbornene allyl acetate (yield: 40.1 mol % of total monomer input). Number average molecular weight of the polymer was 41,000, and weight average molecular weight is 100,000.

Example 19

Preparation of Addition Copolymer of Norbornene Carboxylic Acid Methyl Ester/Norbornene Allyl Acetate using Tricyclohexyl Phosphine and Pd(acac)$_2$ as a Catalyst Into a 250 ml Schlenk flask, 5.89 g (38.7 mmol) of the exo-rich norbornene carboxylic acid methyl ester prepared in the Preparation Example 1 and 15.0 g (90.2 mmol) of the endo-rich norbornene allyl acetate prepared in the Preparation Example 4 as monomers and 41 ml of purified toluene solvent were introduced. Into the flask, 2.89 mg of Pd(acac)$_2$ and 3.62 mg of tricyclohexyl phosphine dissolved in 5 ml of CH$_2$Cl$_2$ as a catalyst and 20.66 mg of dimethylanilinium tetrakis(pentafluorophenyl)borate as a co-catalyst were introduced. Then, reaction was carried out at 90° C. for 18 hours while stirring.

After the reaction was completed, the reactant was introduced into an excessive ethanol to obtain a copolymer precipitate. The precipitate was filtered with a glass funnel and the recovered copolymer was dried at 65° C. for 24 hours to obtain 10.48 g of copolymer of norbornene carboxylic acid methyl ester and norbornene allyl acetate (yield: 50.2 mol % of total monomer input). Number average molecular weight of the polymer was 59,000, and weight average molecular weight is 144,000.

Example 20

Preparation of Addition Copolymer of Norbornene Carboxylic Acid Butylester/Norbornene Allyl Acetate using Tricyclohexyl Phosphine and Pd(acac)$_2$ as a Catalyst Into a 250 ml Schlenk flask, 9.35 g (48.1 mmol) of the exo-rich norbornene carboxylic acid butyl ester prepared in the Preparation Example 3 and 8.0 g (48.1 mmol) of the endo-rich norbornene allyl acetate prepared in the Preparation Example 4 as monomers and 35.24 ml of purified toluene solvent were introduced. Into the flask, 2.16 mg of Pd(acac)$_2$ and 2.70 mg of tricyclohexyl phosphine dissolved in 5 ml of CH$_2$Cl$_2$ as a catalyst and 15.42 mg of dimethylanilinium tetrakis(pentafluorophenyl)borate as a co-catalyst were introduced. Then, reaction was carried out at 90° C. for 18 hours while stirring.

After the reaction was completed, the reactant was introduced into an excessive ethanol to obtain a copolymer precipitate. The precipitate was filtered with a glass funnel and the recovered copolymer was dried at 65° C. for 24 hours to obtain 2.89 g of copolymer of norbornene carboxylic acd butyl ester and norbornene allyl acetate (yield: 16.4 mol % of total monomer input). Number average molecular weight of the polymer was 52,000, and weight average molecular weight is 97,000.

Example 21

Preparation of Addition Copolymer of Norbornene Carboxylic Acid Butyl Ester/Norbornene Allyl Acetate using Tricyclohexyl Phosphine and Pd(acac)$_2$ as a Catalyst Into a 250 ml Schlenk flask, 15.0 g (77.2 mmol) of the exo-rich norbornene carboxylic acid butyl ester prepared in the Preparation Example 3 and 5.5 g (33.1 mmol) of the endo-rich norbornene allyl acetate prepared in the Preparation Example 4 as monomers and 41.9 ml of purified toluene solvent were introduced. Into the flask, 2.48 mg of Pd(acac)$_2$ and 3.09 mg of tricyclohexyl phosphine dissolved in 5 ml of CH$_2$Cl$_2$ as a catalyst and 17.67 mg of dimethylanilinium tetrakis(pentafluorophenyl)borate as a co-catalyst were introduced. Then, reaction was carried out at 90° C. for 18 hours while stirring.

After the reaction was completed, the reactant was introduced into an excessive ethanol to obtain a copolymer precipitate. The precipitate was filtered with a glass funnel and the recovered copolymer was dried at 65° C. for 24 hours to obtain 4.63 g of copolymer of norbornene carboxylic acd butyl ester and norbornene allyl acetate (yield: 22.6 mol % of total monomer input). Number average molecular weight of the polymer was 48,000, and weight average molecular weight is 91,000.

Example 22

Preparation of Addition Copolymer of Norbornene Carboxylic Acid Butyl Ester/Norbornene Allyl Acetate using Tricyclohexyl Phosphine and Pd(acac)$_2$ Into a 250 ml Schlenk flask, 6.51 g (33.5 mmol) of the exo-rich norbornene carboxylic acid butyl ester prepared in the Preparation Example 3 and 13.0 g (78.2 mmol) of the endo-rich norbornene allyl acetate prepared in the Preparation Example 4 as monomers and 39.4 ml of purified toluene solvent were introduced. Into the flask, 2.51 mg of Pd(acac)$_2$ and 3.13 mg of tricyclohexyl phosphine dissolved in 5 ml of CH$_2$Cl$_2$ as a catalyst and 17.90 mg of dimethylanilinium tetrakis(pentafluorophenyl)borate as a co-catalyst were introduced. Then, reaction was carried out at 90° C. for 18 hours while stirring.

After the reaction was completed, the reactant was introduced into an excessive ethanol to obtain a copolymer precipitate. The precipitate was filtered with a glass funnel and the recovered copolymer was dried at 65° C. for 24 hours to obtain 6.65 g of copolymer of norbornene carboxylic acd butyl ester and norbornene allyl acetate (yield: 34.1 mol % of total monomer input). Number average molecular weight of the polymer was 56,000, and weight average molecular weight is 113,000.

Example 23

Preparation of Copolymer of Butyl Norbornene and 5-norbornene-2-yl Acetate using Tricyclohexyl Phosphine and Pd(acac)$_2$ as a Catalyst Into a 250 ml Schlenk flask, 9.40 g (61.37 mmol) of the exo-rich 5-norbornene-2-yl acetate (containing 88 mol % of exo) and 9.20 g (61.37 mmol) of butyl norbornene as monomers and 35 ml of purified toluene solvent were introduced. Into the flask, 3.76 mg of Pd(acac)$_2$ and 3.46 mg of tricyclohexyl phosphine dissolved in 5 ml of toluene as a catalyst and 19.8 mg of dimethylanilinium tetrakis(pentafluorophenyl)borate as a co-catalyst were introduced. Then, reaction was carried out at 90° C. for 18 hours while stirring.

After the reaction was completed, the reactant was introduced into an excessive ethanol to obtain a copolymer precipitate. The precipitate was filtered with a glass funnel and the recovered copolymer was dried at 65° C. for 24 hours to obtain 12.18 g of copolymer of 5-norbornene-2-yl acetate and butyl norbornene (yield: 65.5 mol % of total monomer input). Number average molecular weight of the polymer was 93,000, and weight average molecular weight is 207,000.

Example 24

Preparation of Copolymer Hexyl Norbornene and 5-norbornene-2-yl Acetate using Tricyclohexyl Phosphine and Pd(acac)$_2$ as a Catalyst Into a 250 ml Schlenk flask, 9.40 g (61.37 mmol) of the exo-rich 5-norbornene-2-yl acetate (containing 88 mol % of exo) and 11.01 g (61.37 mmol) of hexyl norbornene as monomers and 39 ml of purified toluene solvent were introduced. Into the flask, 3.76 mg of Pd(acac)$_2$ and 3.46 mg of tricyclohexyl phosphine dissolved in 5 ml of toluene as a catalyst and 19.8 mg of dimethylanilinium tetrakis(pentafluorophenyl)borate dissolved in 2 ml of CH$_2$Cl$_2$ as a co-catalyst were introduced. Then, reaction was carried out at 90° C. for 18 hours while stirring.

After the reaction was completed, the reactant was introduced into an excessive ethanol to obtain a copolymer precipitate. The precipitate was filtered with a glass funnel and the recovered copolymer was dried at 65° C. for 24 hours to obtain 14.31 g of copolymer of 5-norbornene-2-yl acetate and hexyl norbornene (yield: 70.1 mol % of total monomer input). Number average molecular weight of the polymer was 104,000, and weight average molecular weight is 243,000.

Example 25

Preparation of Copolymer of Phenyl Norbornene and Norbornene Carboxylic Acid Butylester using Tricyclohexyl Phosphine and Pd(acac)$_2$ as a Catalyst Into a 250 ml Schlenk flask, 7.0 g (41.1 mol) of phenyl norbornene and 6.13 g (41.1 mol) of the exo-rich norbornene carboxylic acid butylester prepared in the Preparation Example 3 as monomers and 28 ml of purified toluene solvent were introduced. Into the flask, 1.85 mg of Pd(acac)$_2$ and 2.31 mg of tricyclohexyl phosphine dissolved in 3 ml of CH$_2$Cl$_2$ as a catalyst and 13.18 mg of dimethylanilinium tetrakis(pentafluorophenyl)borate as a co-catalyst were introduced. Then, reaction was carried out at 90° C. for 18 hours while stirring.

After the reaction was completed, the reactant was introduced into an excessive ethanol to obtain a copolymer precipitate. The precipitate was filtered with a glass funnel and the recovered copolymer was dried at 65° C. for 24 hours to obtain 9.5 g of copolymer of phenyl norbornene and norbornene carboxylic acid butylester (yield: 72.4 mol % of total monomer input). Number average molecular weight of the polymer was 109,000, and weight average molecular weight is 265,000.

Example 26

Preparation of Copolymer of Norbornene Carboxylic Acid Methylester and Norbornene Allyl Acetate using Tricyclohexyl Phosphine and Pd(acac)$_2$ as a Catalyst Into a 250 ml Schlenk flask, 9.16 (60.2 mmol) of the exo-rich norbornene carboxylic acid methylester prepared in the Preparation Example 1 and 10.0 g (60.2 mmol) of endo-rich norbornene allyl acetate prepared in the Preparation Example 4 as monomers and 38 ml of purified toluene solvent were introduced. Into the flask, 2.7 mg of Pd(acac)$_2$ and 3.37 mg of tricyclohexyl phosphine dissolved in 5 ml of CH$_2$Cl$_2$ as a catalyst and 19.2 mg of dimethylanilinium tetrakis(pentafluorophenyl)borate as a co-catalyst were introduced. Then, reaction was carried out at 90° C. for 18 hours while stirring.

After the reaction was completed, the reactant was introduced into an excessive ethanol to obtain a copolymer precipitate. The precipitate was filtered with a glass funnel and the recovered copolymer was dried at 65° C. for 24 hours to obtain 5.56 g of copolymer of norbornene carboxylic acid methylester and norbornene allyl acetate (yield: 29.0 mol % of total monomer input). Number average molecular weight of the polymer was 53,000, and weight average molecular weight is 122,000.

Example 27

Surface Tension Measurement of Butylester Norbornene Homopolymer

In order to measure surface tension of butyl ester norbornene polymer prepared in Example 2, it was dissolved in toluene$_2$ to 20 wt % and cast on a petri dish. After 3 hours at room temperature, the dish was dried at 120° C. for 6 hours to obtain a film having a thickness of 120 μm. Surface tension of the film was calculated from contact angles of H$_2$O and CH$_2$I$_2$, by the following Equation 1 (Wu, S. J. *Polym. Sci.* C Vol 34, p 19, 1971).

$$\gamma_S = \gamma_{SL} + \gamma_{LV} \cos\theta \quad \text{[Equation 1]}$$

$$\gamma_{SL} = \gamma_S + \gamma_{LV} - 4\left(\frac{\gamma_{LV}^d \gamma_S^d}{\gamma_{LV}^d + \gamma_S^d} + \frac{\gamma_{LV}^p \gamma_S^p}{\gamma_{LV}^p + \gamma_S^p}\right)$$

In Equation 1, $\gamma_S$ is the surface tension of the film; $\gamma_{LV}$ is the surface tension of the liquid; $\gamma_{SL}$ is the interfacial tension of film and liquid; θ is the contact angle; $\gamma^d$ is the distribution (dispersion) term of surface tension; and $\gamma^p$ is the polar term of surface tension.

For water ($\gamma^d$=44.1 mN/m, $\gamma^p$=6.7 mN/m), the contact angle was 74.3°, and for diiodomethane ($\gamma^d$=22.1 mN/m, $\gamma^p$=50.7 mN/m), 33.5°. From these values, the surface tension was calculated to be 49.5 mN/m.

Example 28

Metal Adhesivity Test of Butylester Norbornene Homopolymer

In order to test metal adhesivity of butyl ester norbornene homopolymer prepared in Example 2, it was dissolved in toluene to 10 wt % and coated on glass plates respectively having chrome, aluminum and tungsten patterns to a thickness of ~2 μm. Horizontal and vertical lines were drawn to form lattice patterns on the glass plate with 5 mm spacing, and a 180° taping test was carried out. None of the three lattice patterns were separated from the glass plate.

Example 29

Adhesivity to PVA Polarizer of Butylester Norbornene Homopolymer

A PVA polarizer was treated with a butyl ester norbornene film that was cast in Example 27. The film was corona surface-treated 3 times with an 8 mA current at a line speed of 6 m/min. Contact angles were 20.7° for water and 22° for diiodomethane. Surface tension was calculated to be 76.9 mN/m.

Within 30 minutes after the corona treatment, the fully dried PVA polarizer (iodine type; transmissivity=44%) was roll-pressed with a 10 wt % PVA aqueous solution, and then dried at 80° C. for 10 minutes. The PVA polarizer roll-pressed with butyl ester norbornene had very superior adhesivity.

The present invention prepares a cyclic olefin addition polymer using a catalytic system capable of avoiding a decrease of catalytic activity due to an ester or acetyl group of an endo isomer. According to the present invention, superior polymerization result can be obtained with a very small amount of catalyst. An addition polymer of norbornene having an ester or acetyl group prepared by the present invention is a cyclic olefin addition polymer which is transparent, has good adhesivity to metal or polymers having other polar groups, generates no byproducts when attached to metal, has a low dielectric constant so that it can be used for insulating electronic devices, and has superior thermal stability and mechanical strength.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method, comprising:
    contacting a norbornene-based monomer having an ester or acetyl group with a catalyst system comprising:
    i) a Group X transition metal compound represented by M(R)$_2$, wherein M is a Group X metal and R is a ligand selected from the group consisting of acetate, and acetylacetonate (R"C(O)CHC(O)R"), wherein each of R" is hydrogen; C$_1$ to C$_{20}$ linear or branched alkyl, alkenyl, or vinyl; C$_5$ to C$_{12}$ cycloalkyl substituted with hydrocarbon or unsubstituted; C$_6$ to C$_{40}$ aryl substituted with hydrocarbon or unsubstituted; C$_6$ to C$_{40}$ aryl having hetero atom; C$_7$ to C$_{15}$ aralkyl substituted with hydrocarbon or unsubstituted; or C$_3$ to C$_{20}$ alkynyl;
    ii) a compound comprising a neutral Group XV electron donor ligand having a cone angle of at least 160°; and
    iii) a salt capable of offering an anion that can be weakly coordinated to the i) transition metal,
    in solvent to conduct an addition polymerization; and
    forming a norbornene-based addition polymer having a polar group of ester or acetyl having a number average molecular weight (Mn) of 10,000 to 1,000,000, which is a norbornene-based homopolymer comprising an ester or acetyl group or a copolymer of norbornene-based monomers comprising different ester or acetyl groups.

2. The method for preparing a norbornene-based addition polymer according to claim 1, wherein the catalyst is introduced in an amount of 1/2500 to 1/100,000, based on the moles of the introduced monomers.

3. The method for preparing a norbornene-based addition polymer according to claim 1, wherein the catalyst system comprises:
   i) 1 mol of the compound of a Group X transition metal;
   ii) 1 to 3 mols of the compound comprising a neutral Group XV electron donor ligand having a cone angle of at least 160°; and
   iii) 1 to 2 mols of the salt capable of offering an anion that can be weakly coordinated to the i) transition metal.

4. The method for preparing a norbornene-based addition polymer according to claim 1, wherein the ii) compound comprising a neutral Group XV electron donor ligand with a cone angle of at least 160° is represented by the following Chemical Formula 2 or Chemical Formula 3:

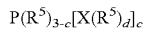  [Chemical Formula 2]

wherein

X is oxygen, sulfur, silicon, or nitrogen;

c is an integer of 0 to 3;

d is 1 if X is oxygen or sulfur, 3 if X is silicon, and 2 if X is nitrogen;

if c is 3 and X is oxygen, two or three $R^5$ groups may be connected with each other through oxygen to form a cyclic group; and if c is 0, two $R^5$ groups may be connected with each other to form a phosphacycle; and $R^5$ is hydrogen; a $C_1$ to $C_{20}$ linear or branched alkyl, alkoxy, allyl, alkenyl, or vinyl; a $C_5$ to $C_{12}$ cycloalkyl substituted with hydrocarbon or unsubstituted; a $C_6$ to $C_{40}$ aryl substituted with hydrocarbon or unsubstituted; a $C_7$ to $C_{15}$ aralkyl substituted with hydrocarbon or unsubstituted; a $C_3$ to $C_{20}$ alkynyl; a tri($C_1$ to $C_{10}$ linear or branched alkyl)silyl; a tri($C_1$ to $C_{10}$ linear or branched alkoxy)silyl; a tri($C_5$ to $C_{12}$ cycloalkyl substituted with hydrocarbon or unsubstituted)silyl; a tri ($C_6$ to $C_{40}$ aryl substituted with hydrocarbon or unsubstituted)silyl; a tri($C_6$ to $C_{40}$ aryloxy substituted with hydrocarbon or unsubstituted)silyl; a tri($C_1$ to $C_{10}$ linear or branched alkyl)siloxy; a tri($C_5$ to $C_{12}$ cycloalkyl substituted with hydrocarbon or unsubstituted)siloxy; or a tri($C_6$ to $C_{40}$ aryl substituted with hydrocarbon or unsubstituted)siloxy, wherein each substituent can be further substituted with a linear or branched haloalkyl or halogen; and

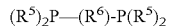  [Chemical Formula 3]

wherein $R^5$ is the same as defined in the Chemical Formula 2; and $R^6$ is a $C_1$ to $C_5$ linear or branched alkyl, alkenyl, or vinyl; a $C_5$ to $C_{12}$ cycloalkyl substituted with hydrocarbon or unsubstituted; a $C_6$ to $C_{20}$ aryl substituted with hydrocarbon or unsubstituted; or a $C_7$ to $C_{15}$ aralkyl substituted with hydrocarbon or unsubstituted.

5. The method for preparing a norbornene-based addition polymer according to claim 1, wherein the iii) salt capable of offering an anion that can be weakly coordinated to the transition metal is represented by the following Chemical Formula 4:

  [Chemical Formula 4]

wherein

"Cat" is a cation selected from a group comprising a hydrogen ion; a cation of a Group I metal, a Group II metal, or a transition metal; and an organic group comprising the same, to which the ii) neutral Group XV electron donor compound can be bonded;

"Anion", which can be weakly coordinated by the Group X transition metal, is selected from a group comprising borate, aluminate, $SbF_6$, $PF_6$, $AlF_3O_3SCF_3$, $SbF_5SO_3F$, $AsF_6$, perfluoroacetate ($CF_3CO_2$), perfluoropropionate ($C_2F_5CO_2$), perfluorobutyrate ($CF_3CF_2CF_2CO_2$), perchlorate ($ClO_4$), p-toluenesulfonate (p-$CH_3C_6H_4SO_3$), boratabenzene, and caborane substituted with hydrocarbon or unsubstituted; and a and b respectively represent the numbers of cations and anions, respectively, determined so as to satisfy charge neutrality.

6. The method for preparing a norbornene-based addition polymer according to claim 5, wherein the organic group comprising a cation is selected from a group consisting of ammonium selected from [NH($R^7$)$_3$]$^+$ and [N($R^7$)$_4$]$^+$; phosphonium selected from [PH($R^7$)$_3$]$^+$ and [P($R^7$)$_4$]$^+$; carbonium selected from [C($R^7$)$_3$]$^+$; and silylium selected from [Si($R^7$)$_3$]$^+$ (wherein $R^7$ is a $C_1$ to $C_{20}$ linear or branched alkyl, alkyl, or silyl alkyl substituted with a halogen; a $C_5$ to $C_{12}$ cycloalkyl substituted with hydrocarbon or unsubstituted; a cycloalkyl or silyl cycloalkyl substituted with halogen; a $C_6$ to $C_{40}$ aryl substituted by hydrocarbon or unsubstituted; an aryl or silyl aryl substituted with halogen; a $C_7$ to $C_{15}$ aralkyl substituted with hydrocarbon or unsubstituted; or an aralkyl or silyl aralkyl substituted with halogen).

7. The method for preparing a norbornene-based addition polymer according to claim 5, wherein the borate or the aluminate is represented by the following Chemical Formula 5 or Chemical Formula 6:

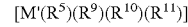  [Chemical Formula 5]

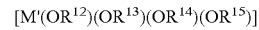  [Chemical Formula 6]

wherein

M' is boron or aluminum; and each of $R^8$, $R^9$, $R^{10}$, $R^{11}$, $R^{12}$, $R^{13}$, $R^{14}$, and $R^{15}$ is $C_1$ to $C_{20}$ linear or branched alkyl or alkenyl substituted with halogen or unsubstituted; $C_5$ to $C_{12}$ cycloalkyl substituted with hydrocarbon or unsubstituted; $C_6$ to $C_{40}$ aryl substituted with hydrocarbon or unsubstituted; $C_7$ to $C_{15}$ aralkyl substituted with hydrocarbon or unsubstituted; $C_3$ to $C_{20}$ alkynyl; $C_3$ to $C_{20}$ linear or branched trialkylsiloxy; or $C_{18}$ to $C_{48}$ linear or branched trialkylsiloxy.

8. The method for preparing a norbornene-based addition polymer according to claim 1, wherein the norbornene-based monomer having an ester or acetyl group is represented by the following Chemical Formula 7:

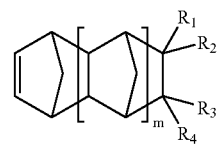

[Chemical Formula 7]

wherein m is an integer of 0 to 4;

at least one of $R_1$, $R_2$, $R_3$, and $R_4$ is a radical having an ester or acetyl group;

each of the other $R_1$, $R_2$, $R_3$, and $R_4$ is hydrogen; linear or branched $C_1$ to $C_{20}$ alkyl, alkenyl, or vinyl; $C_5$ to $C_{12}$ cycloalkyl substituted with hydrocarbon or unsubstituted; $C_6$ to $C_{40}$ aryl substituted with hydrocarbon or unsubstituted; $C_7$ to $C_{15}$ aralkyl substituted with hydrocarbon or unsubstituted; $C_3$ to $C_{20}$ alkynyl; or halogen; and if $R_1$, $R_2$, $R_3$ and $R_4$ are not radical having an ester or acetyl group, a hydrogen or a halogen, $R_1$ and $R_2$, or $R_3$ and $R_4$ may be connected to form a $C_1$ to $C_{10}$ alkylidene group, or, $R_1$ or $R_2$ may be connected with $R_3$ or $R_4$ to form a $C_4$ to $C_{12}$ saturated or unsaturated cyclic group or a $C_6$ to $C_{17}$ aromatic group.

9. A norbornene-based addition polymer comprising an ester or acetyl group prepared by the method of claim 1.

10. The norbornene-based addition polymer according to claim 9, which is selected from a norbornene-based homopolymer comprising an ester or acetyl group; a copolymer of norbornene-based monomers comprising different ester or acetyl groups; or a copolymer of a norbornene-based monomer comprising an ester or acetyl group and a norbornene-based monomer that does not comprise an ester or acetyl group.

* * * * *